United States Patent
Fakoorian et al.

(10) Patent No.: US 12,267,871 B2
(45) Date of Patent: Apr. 1, 2025

(54) RACH PROCEDURE COVERAGE ENHANCEMENT AND RECOVERY

(71) Applicant: APPLE INC., Cupertino, CA (US)

(72) Inventors: Seyed Ali Akbar Fakoorian, Cupertino, CA (US); Chunhai Yao, Beijing (CN); Chunxuan Ye, San Diego, CA (US); Dawei Zhang, Cupertino, CA (US); Haitong Sun, Cupertino, CA (US); Hong He, Cupertino, CA (US); Oghenekome Oteri, San Diego, CA (US); Sigen Ye, Cupertino, CA (US); Wei Zeng, Cupertino, CA (US); Weidong Yang, San Diego, CA (US); Yushu Zhang, Beijing (CN)

(73) Assignee: APPLE INC., Cupertino, CA (US)

( * ) Notice: Subject to any disclaimer, the term of this patent is extended or adjusted under 35 U.S.C. 154(b) by 432 days.

(21) Appl. No.: 17/593,753

(22) PCT Filed: Oct. 9, 2020

(86) PCT No.: PCT/CN2020/119942
§ 371 (c)(1),
(2) Date: Sep. 23, 2021

(87) PCT Pub. No.: WO2022/073188
PCT Pub. Date: Apr. 14, 2022

(65) Prior Publication Data
US 2022/0322447 A1    Oct. 6, 2022

(51) Int. Cl.
*H04W 74/08* (2024.01)
*H04W 74/00* (2009.01)
*H04W 74/0833* (2024.01)

(52) U.S. Cl.
CPC ..... *H04W 74/0833* (2013.01); *H04W 74/006* (2013.01)

(58) Field of Classification Search
CPC .......... H04W 74/0833; H04W 74/006; H04W 72/23; H04W 74/002; H04W 74/0841;
(Continued)

(56) References Cited

U.S. PATENT DOCUMENTS

2016/0227580 A1* 8/2016 Xiong .................... H04W 72/52
2017/0273113 A1* 9/2017 Tirronen ............... H04W 72/21
(Continued)

FOREIGN PATENT DOCUMENTS

CN  110022610 A    7/2019
EP  3817490 A1 *  5/2021  ............... H04L 1/08
(Continued)

OTHER PUBLICATIONS

Ericsson , "PUSCH coverage enhancement", R1-2006613, 3GPP TSG-RAN WG1 Meeting #102-e, Agenda Item 8.8.2.1, Aug. 17-28, 2020, 11 pages.
(Continued)

*Primary Examiner* — Vinncelas Louis
(74) *Attorney, Agent, or Firm* — Dorsey & Whitney LLP

(57) ABSTRACT

Providing coverage enhancements for a user equipment (UE) includes decoding a random access channel (RACH) preamble received from a user equipment (UE) via a physical random access channel (PRACH). A number of repetitions associated with transmitting a random access response (RAR) over a physical downlink shared channel (PDSCH) may be determined in response to the RACH preamble. A transmission for the UE to be sent over a physical downlink control channel (PDCCH) may be encoded. The transmis-
(Continued)

sion may indicate the number of repetitions to the UE using one or more reserved bits of a downlink control information (DCI).

9 Claims, 13 Drawing Sheets

(58) Field of Classification Search
CPC ......... H04L 1/001; H04L 1/0025; H04L 1/08; H04L 1/1822; H04L 5/0051; H04B 7/1851
See application file for complete search history.

(56) References Cited

U.S. PATENT DOCUMENTS

| | | | |
|---|---|---|---|
| 2017/0347361 A1* | 11/2017 | Tsuboi | H04W 72/54 |
| 2020/0015258 A1 | 1/2020 | Zhou et al. | |
| 2020/0267772 A1 | 8/2020 | Jung et al. | |
| 2021/0144720 A1* | 5/2021 | Xu | H04L 5/0051 |
| 2021/0195652 A1* | 6/2021 | Taherzadeh Boroujeni | H04W 76/27 |
| 2021/0352712 A1* | 11/2021 | Ly | H04W 74/0841 |
| 2022/0029733 A1* | 1/2022 | Ye | H04B 7/1851 |

FOREIGN PATENT DOCUMENTS

| | | |
|---|---|---|
| WO | 2017052445 A1 | 3/2017 |
| WO | 2019213978 A1 | 11/2019 |
| WO | 2020033580 A1 | 2/2020 |

OTHER PUBLICATIONS

Intel Corporation, "Discussion on potential techniques for PUSCH coverage enhancement", R1-2005889, 3GPP TSG RAN WG1 #102-e, Agenda Item 8.8.2.1, Aug. 17-28, 2020, 11 pages.

Zte Corporation (Moderator), "Feature lead summary on coverage enhancement for channels other than PUSCH and PUCCH", R1-2007392, 3GPP TSG RAN WG1 #102-e, Agenda Item 8.8.2.3, Aug. 17-28, 2020, 53 pages.

WIPO, International Search Report and Written Opinion, PCT/CN2020/119942, Jul. 19, 2021, 9 pages.

VIVO, "Discussion on Coverage enhancements for channels other than PUCCH and PUSCH", R1-2005397, 3GPP TSG RAN WG1 #102, Agenda Item 8.8.2.3, Aug. 17-28, 2020, 4 pages.

Ericsson, "Random access for MTC", R1-156420, 3GPP TSG RAN WG1 Meeting #83, Anaheim, California, USA, Agenda Item 6.2.1.10, Nov. 15-22, 2015, 10 pages.

Zte, "Remaining issues for supporting low-power class UE for NB-Iot", R1-1612606, 3GPP TSG RAN WG1 Meeting #87, Reno, Nevada, USA, Agenda Item 6.2.9.5, Nov. 14-18, 2016, 4 pages.

* cited by examiner

RACH PROCEDURE COVERAGE ENHANCEMENT AND RECOVERY

TECHNICAL FIELD

This application relates generally to wireless communication systems, including providing coverage enhancements to user equipment.

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE) (e.g., 4G) or new radio (NR) (e.g., 5G); the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi. In 3GPP radio access networks (RANs) in LTE systems, the base station can include a RAN Node such as a Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANs, RAN Nodes can include a 5G Node. NR node (also referred to as a next generation Node B or g Node B (gNB)).

RANs use a radio access technology (RAT) to communicate between the RAN Node and UE. RANs can include global system for mobile communications (GSM), enhanced data rates for GSM evolution (EDGE) RAN (GERAN), Universal Terrestrial Radio Access Network (UTRAN), and/or E-UTRAN, which provide access to communication services through a core network. Each of the RANs operates according to a specific 3GPP RAT. For example, the GERAN implements GSM and/or EDGE RAT, the UTRAN implements universal mobile telecommunication system (UMTS) RAT or other 3GPP RAT, the E-UTRAN implements LTE RAT, and NG-RAN implements 5G RAT. In certain deployments, the E-UTRAN may also implement 5G RAT.

Frequency bands for 5G NR may be separated into two different frequency ranges. Frequency Range 1 (FR1) includes sub-6 GHz frequency bands, some of which are bands that may be used by previous standards, but may potentially be extended to cover potential new spectrum offerings from 410 MHz to 7125 MHz. Frequency Range 2 (FR2) includes frequency bands from 24.25 GHz to 52.6 GHz. Bands in the millimeter wave (mmWave) range of FR2 have shorter range but higher available bandwidth than bands in the FR1. Skilled persons will recognize these frequency ranges, which are provided by way of example, may change from time to time or from region to region.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Target channels for identifying coverage enhancements in 5G NR networks include at least physical uplink shared channel (PUSCH) and physical uplink control channel (PUCCH). Enhanced solutions may include time domain, frequency domain, demodulation reference signal (DM-RS) enhancement (including DM-RS-less transmissions), and repetition. In particular, the random access channel (RACH) procedure (both 4-step and 2-step) is particularly targeted for improvement with various coverage enhancements herein.

Figure 1:
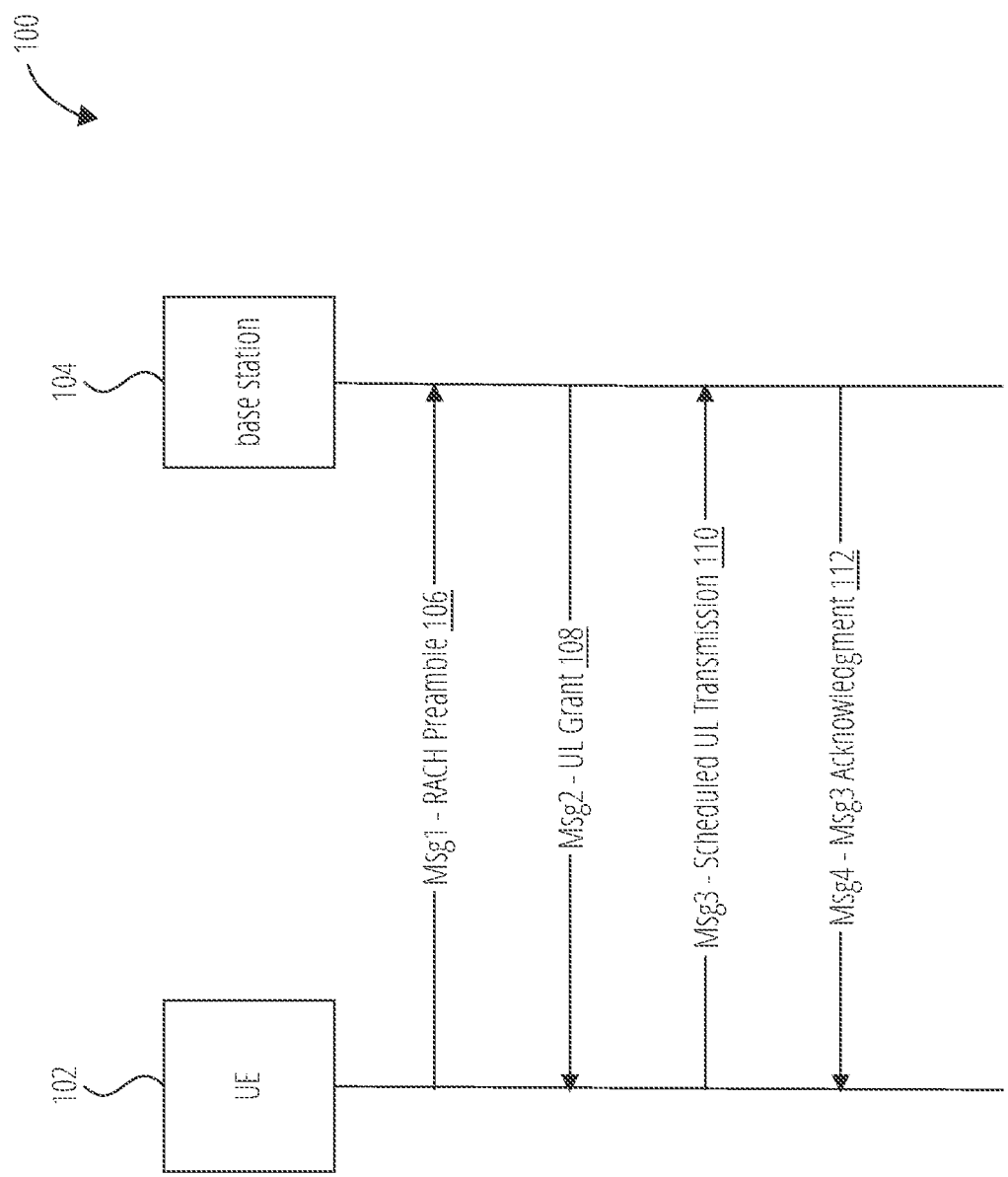
FIG. 1 illustrates a communication flowchart in accordance with one embodiment.

FIG. 1 illustrates the 4-step RACH procedure in the form of communication flowchart 100. As illustrated, the 4-step RACH procedure begins when UE 102 transmits Message 1 (Msg1) 106, which includes a RACH preamble on a physical random access channel (PRACH) to an appropriate beam of Base station 104 (e.g., a gNB). Notably, PRACH resources are associated with the downlink (DL) synchronization signal block (SSB) index. As such, the gNB may know the best UE's SSB.

Upon receiving/decoding the preamble, the Base station 104 responds to the UE's random access (RA) by transmitting Message 2 (Msg2) 108, which is scheduled by a physical downlink control channel (PDCCH) downlink control information (DCI) format 1_0 with a cyclic redundancy check (CRC) scrambled by a random access-radio network temporary identifier (RA-RNTI). In addition. Msg2 is sent over a physical downlink shared channel (PDSCH) and includes a temporary cell-radio network temporary identifier (TC-RNTI), a timing advance, and an uplink (UL) grant (e.g., random access response (RAR) UL grant) for the UE's future Message 3 (Msg3) transmission.

The UE 102 then transmits Msg3 110 on the PUSCH grant indicated by the Base station 104 in Msg2. Msg3 may include uplink scheduling information sent over the PUSCH. If the base station fails to decode Msg3, the base station will send a PDCCH DCI format 0_0 with CRC scrambled by TC-RNTI to reschedule Msg3. In addition, Msg3's waveform, discrete Fourier transform-spread-orthogonal frequency-division multiplexing (DFT-s-OFDM) or orthogonal frequency-division multiplexing (OFDM), is broadcast in remaining minimum system information (RMSI). The Base station 104 acknowledges reception of the UE's Msg3 by scheduling a PDSCH grant, which is referred to herein as Message 4 (Msg4) 112. In addition, as part of Msg4 112, the base station 104 assists the UE 102 with contention resolution. The UE 102 then monitors both fallback DCI format 0_0 and the fallback DCI format 1_0 with CRC scrambled by TC-RNT. Notably, DCI format 0_0 reschedules Msg3, while DCI format 1_0 schedules a PDSCH.

Figure 2:
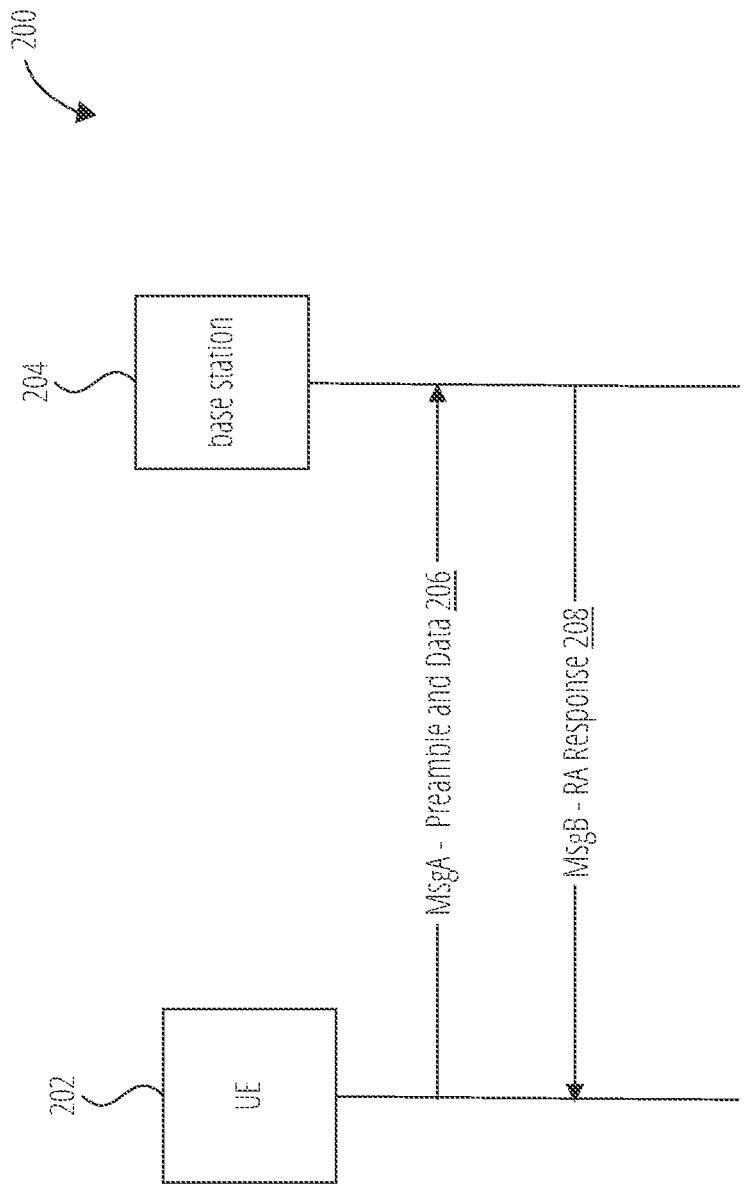
FIG. 2 illustrates a communication flowchart in accordance with one embodiment.

FIG. 2 illustrates the 2-step RACH procedure in the form of communication flowchart 200. As illustrated, UE 202 initiates the 2-step RACH procedure by transmitting Message A (MsgA) 106 to base station 204. MsgA essentially comprises Msg1 and Msg3 of the four-step RACH procedure. For instance, MsgA 106 may include a RACH preamble similar to Msg1 and the PUSCH of Msg3. Similarly, Message B (MsgB) 208 sent from the base station 204 to the UE 202 essentially comprises Msg2 and Msg4 of the 4-step RACH procedure. For instance, MsgB 208 may include an RAR UL grant similar to Msg2 and contention resolution similar to Msg4.

In the current NR specification (i.e., 3GPP Release 16), Msg2 and Msg3 of the 4-step RACH procedure are scheduled with a fallback DL DCI and a fallback UL DCI, respectively. However, scheduling with a fallback DCI currently cannot support repetition. Accordingly, the disclosure herein discusses solutions that are capable of enhancing coverage for the RACH procedure, including Msg2 and Msg3. For instance, such solutions discussed herein include: 1. Explicitly indicating a number of repetitions for both Msg2 and Msg3 in fallback DCIs; and 2. Providing an indication of an applicable waveform rather than RMSI. In particular, three solutions associated with indicating a number of repetitions associated with Msg2, Msg3, and/or MsgB are provided herein, followed by a solution associated with providing an indication of an applicable waveform rather than RMSI.

The first detailed solution includes the gNB indicating a number of repetitions for the PDSCH carrying Msg2 by DCI 1_0 with CRC scrambled by RA-RNTI, which may allow the UE to monitor for the indicated number of repetitions. In particular, this solution includes two options: 1. One (or more) of the reserved bits may indicate number of repetitions. For example, a set number of repetitions can be broadcast in the system information block (SIB) and later the DCI maps to the indication provided in the SIB. In other words, each possible bit value provided in the SIB will be mapped to a particular number of repetitions identifiable via the DCI; or 2. The DCI directly indicates the number of repetitions. For instance, use of the bits 00 indicates no repetition, use of the bits 01 indicates 1 repetition, and so forth.

In addition, a similar proposal may be used to indicate a number of Message B (MsgB) repetitions for DCI 1_0 with CRC scrambled by MsgB-RNTI (note that MsgB comprises the second step of the 2-step RACH procedure). With respect to MsgB repetition indication, the repetition number may be indicated by media access control (MAC) control element (MAC CE).

The second detailed solution includes the gNB indicating a number of repetitions for the PDSCH carrying Msg4 by DCI 1_0 with CRC scrambled by TC-RNTI, which may allow the UE to monitor for the indicated number of repetitions. Notably, DCI format 1_0 with CRC scrambled by TC-RNTI, which is used to schedule Msg4, has only 2 bits reserved in the form of the downlink assignment index (DAI). Accordingly, the gNB may indicate the number of repetitions using the DAI reserved bits.

In such embodiments, the gNB may use all of the reserved DAI bits or just a portion of the reserved DAI bits. In other embodiments, the gNB may reuse other bit fields. In an example, the gNB may indicate the number of repetitions using a hybrid automatic repeat request (HARQ) process number (HPN), which comprises 4 bits. In such an example, the gNB may further utilize a fixed predetermined HARQ index for determining the number of repetitions associated with a particular HPN bit value.

The third detailed solution includes the gNB indicating the number of repetitions for PUSCH carrying Msg3 by DCI 0_0 with CRC scrambled by TC-RNTI, which may allow the UE to send Msg3 in accordance with the indicated number of repetitions. Notably. DCI format 0_0 with CRC scrambled by TC-RNTI, which is used to schedule retransmission of Msg3, has the following bitfields reserved: 1. New data indicator (NDI), which includes 1 reserved bit; and 2. HARQ process number, which includes 4 reserved bits. Accordingly, the gNB may utilize the NDI and/or the HPN bit fields to indicate the number of repetitions.

In particular, the following options may be implemented: 1. A particular number of repetitions can be broadcast in SIB and later mapped to one of them via DCI (i.e., an indirect indication, which includes mapping each of the possible broadcasted bits to a particular predefined number of repetitions); 2. The NDI bit is set to 1 to validate that the bit values in HPN are to be reused for indicating the number of repetitions (or the NDI bit is set to 0 when the bit values in HPN will not be reused for indicating repetitions); or 3. 2LSB (least significant bit) of HPN, 2MSB (most significant bit)) of HPN, or all bits of HPN may be used for indicating the number of repetitions. Both of options 1 or 2 can be a direct indication (e.g., 01 indicates 1 repetition) or an indirect indication (e.g., mapping each possible bit value to a particular predefined number of repetitions).

Regarding the fourth solution, which is related to waveform indications for Msg3, 3GPP TS 38.214, Sec. 6.1.3, provides that for a PUSCH scheduled by random access response (RAR) UL grant, a PUSCH scheduled by fallback RAR UL grant, or a PUSCH scheduled by DCI format 0_0 with CRC scrambled by TC-RNTI, the UE is to consider the transform precoding either 'enabled' or 'disabled' according to the higher layer configured parameter referred to as "msg3-transformPrecoder." In addition, 3GPP TS 38.331 provides that msg3-transformPrecoder is configured the cell-specific parameter IE RACH-ConfigCommon.

Accordingly, the fourth solution is related to enabling transformprecoder for a Msg3 transmission (i.e., for a UE that is to enhance/recover coverage). In particular, the fourth solution includes the gNB indicating whether transformprecoder is enabled or not for the Msg3 transmission via the following options: 1. In RAR UL grant, the single reserved bit in the first Oct may be used to indicate the transform is precoded. For instance, 0 indicates that the transformprecoder is disabled and 1 indicates that the transformprecoder is enabled (or vice versa); 2. For DCI format 0_0 with CRC scrambled by TC-RNTI, some of the reserved bits may be reused to indicate whether transformprecoder is enabled or not. For instance, NDI being 0 indicates that the transformprecoder is disabled and 1 indicates that the transformprecoder is enabled (or vice versa); or 3. An implicit indication may be provided. As a first example, the UE may indicate that it includes a coverage enhancement/recovery (e.g., based on the provided PRACH resource/preamble). The UE may also indicate that it is limited regarding coverage enhancement/recovery (e.g., within a sub-group of bits in the preamble for a coverage-limited UE such as bits 1-10 of the 64 bits). As a second example of an implicit indication, the transformprecoder may be enabled if Msg3 is scheduled with repetition. Similarly, the transformprecoder may be disabled if Msg3 is scheduled with no repetition.

Figure 3:
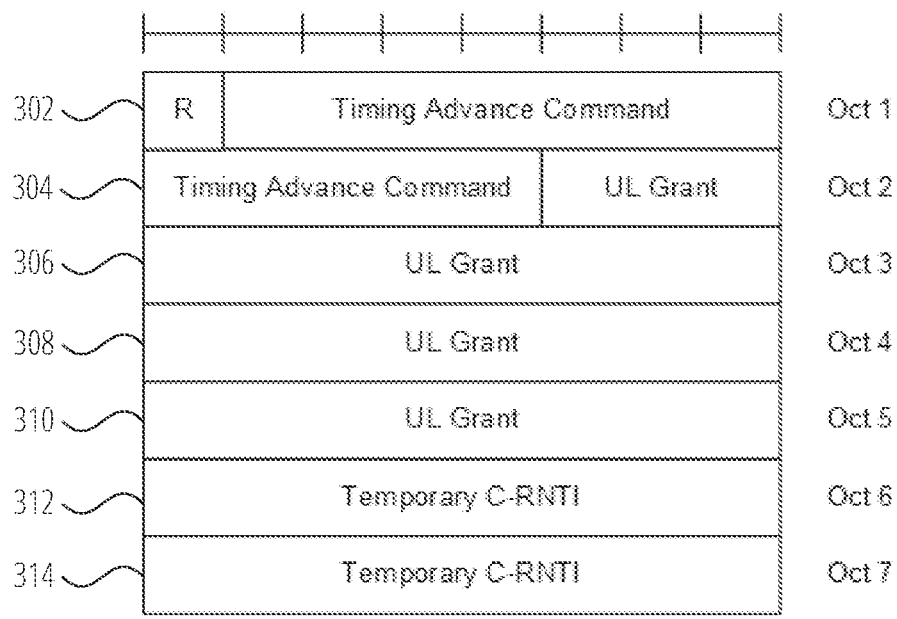
FIG. 3 illustrates an aspect of the subject matter in accordance with one embodiment.

Notably, regarding the first option of the fourth solution above, 3GPP TS 38.321 Section 6.2.3 MAC payload for Random Access Response provides that "The MAC RAR is of fixed size as depicted in [FIG. 3], and consists of the following fields:

R: Reserved bit, set to "0";
Timing Advance Command: The Timing Advance Command field indicates the index value TA used to control the amount of timing adjustment that the MAC entity has to apply in TS 38.213 [6]. The size of the Timing Advance Command field is 12 bits;
UL Grant: The Uplink Grant field indicates the resources to be used on the uplink in TS 38.213 [6]. The size of the UL Grant field is 27 bits;
Temporary C-RNTI: The Temporary C-RNTI field indicates the temporary identity that is used by the MAC entity during Random Access. The size of the Temporary C-RNTI field is 16 bits.
The MAC RAR is octet aligned."

As shown in FIG. 3, the first octet 302 includes the reserved bit R and a portion of the Timing Advance Command; the second octet 304 includes a remaining portion of the Timing Advance Command and portion of the UL Grant; the third octet 306, the fourth octet 308, and the fifth octet 310 each include remaining portions of the UL Grant; and the sixth octet 312 and the seventh octet 314 each include a portion of the Temporary C-RNTI.

Figure 4:
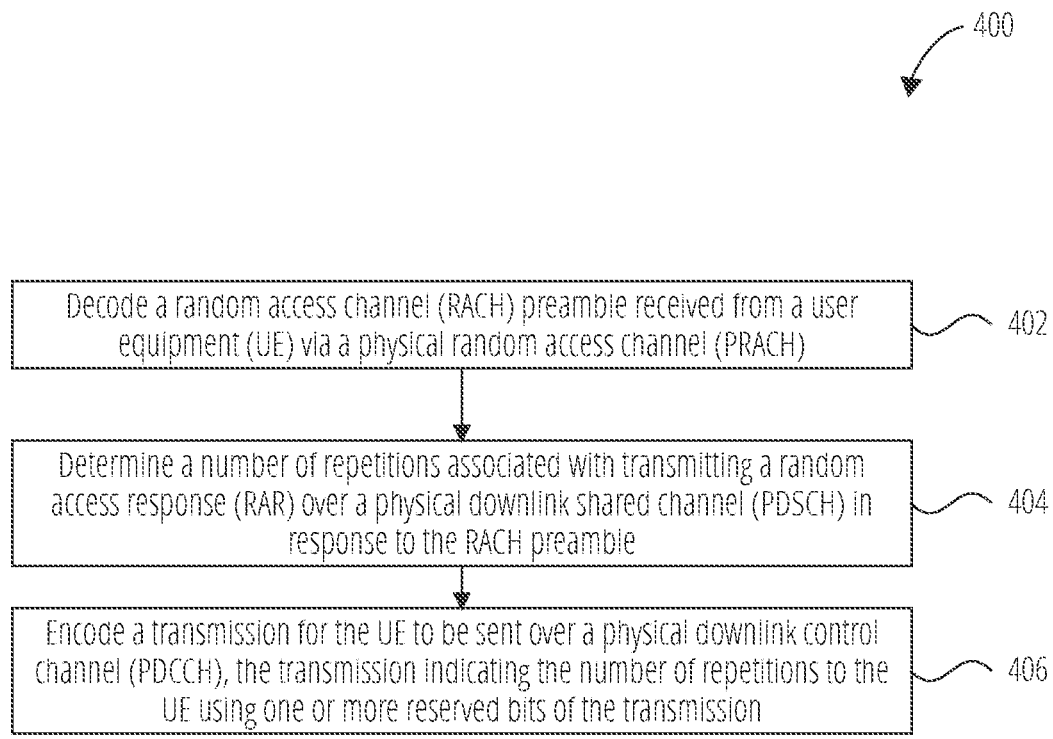
FIG. 4 illustrates a flowchart of a method in accordance with one embodiment.

FIG. 4 illustrates a flowchart of a method 400 for providing a coverage enhancement for a UE comprising an indication of a number of possible repetitions. In block 402, the method 400 decodes a random access channel (RACH) preamble received from a user equipment (UE) via a physical random access channel (PRACH). For instance, the RACH preamble may comprise Msg1 (i.e., step 1) of the RACH procedure. In block 404, the method 400 determines a number of repetitions associated with transmitting a random access response (RAR) over a physical downlink shared channel (PDSCH) in response to the RACH preamble. For example, the base station (e.g., gNB) may determine that the RAR is to be sent four times. In block 406, the method 400 encodes a transmission for the UE to be sent over a physical downlink control channel (PDCCH). In particular, the transmission may indicate the number of repetitions to the UE using one or more reserved bits of the transmission.

The method 400 may also include indicating the number of repetitions in a system information block (SIB) and mapping a downlink control information (DCI) to the indicated number of repetitions in the SIB. The method 400 may also include directly indicating the number of repetitions using the DCI. The method 300 may also include encoding the RAR for transmission over the PDSCH and transmitting the PDSCH up to as many times as the number of repetitions.

The method 400 may also include the DCI comprising DCI format 1_0 with a cyclic redundancy check (CRC) scrambled by a random access-radio network temporary identifier (RA-RNTI). The method 400 may include indicating the number of repetitions using a media access control (MAC) control element (MAC CE).

Figure 5:
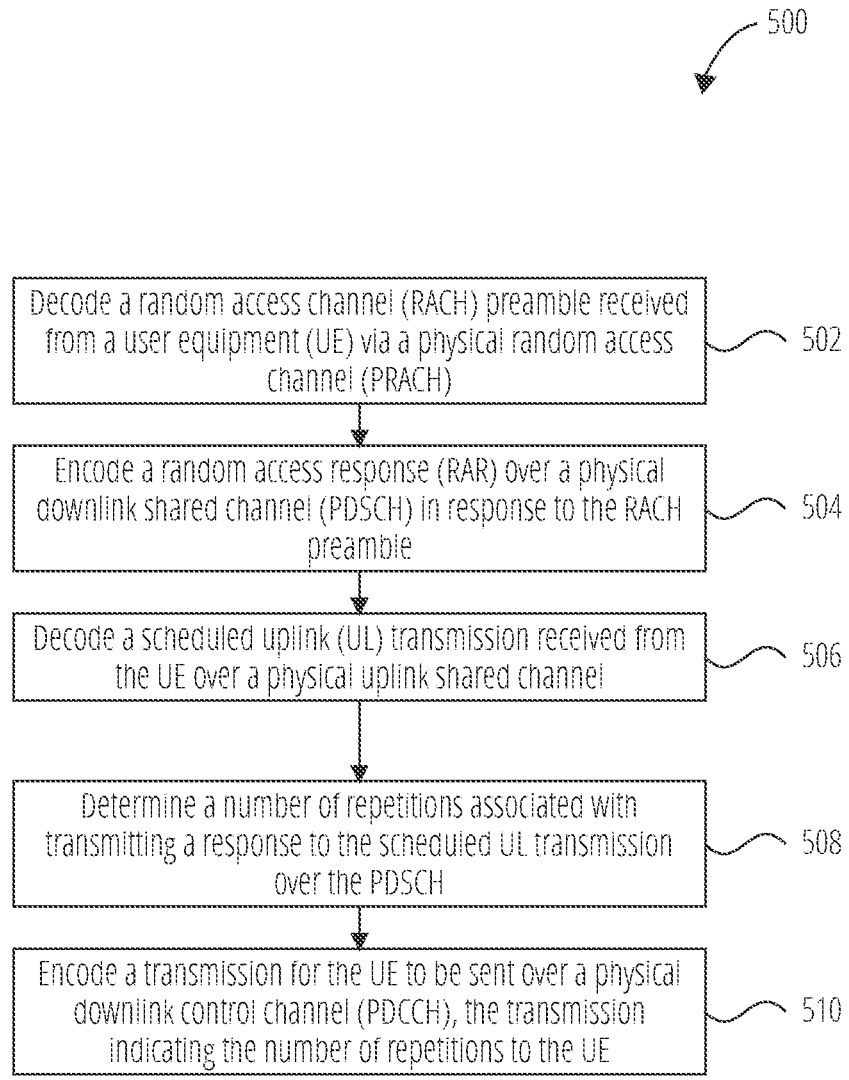
FIG. 5 illustrates a flowchart of a method in accordance with one embodiment.

FIG. 5 illustrates a flowchart of a method 500 for providing a coverage enhancement for a UE comprising an indication of a number of possible repetitions. In block 502, the method 500 decodes a random access channel (RACH) preamble received from a user equipment (UE) via a physical random access channel (PRACH). For instance, the RACH preamble may comprise Msg1 (i.e., step 1) of the RACH procedure. In block 504, the method 500 encodes a random access response (RAR) over a physical downlink shared channel (PDSCH) in response to the RACH preamble. For instance, the RAR may comprise Msg2 (i.e., step 2) of the RACH procedure.

In block 506, the method 500 decodes a scheduled uplink (UL) transmission received from the UE over a physical uplink shared channel. For instance, the scheduled UL transmission may comprise Msg3 (i.e., step 3) of the RACH procedure. In block 508, the method 500 determines a number of repetitions associated with transmitting a response to the scheduled UL transmission over the PDSCH. For example, the base station (e.g., gNB) may determine that the RAR is to be sent three times. In block 510, the method 500 encodes a transmission for the UE to be sent over a physical downlink control channel (PDCCH). In particular, the transmission may indicate the number of repetitions to the UE.

The method 500 may also include using downlink assignment index (DAI) bits to indicate the number of repetitions. The method 500 may also include reusing one or more bits of a hybrid automatic repeat request (HARQ) process number (HPN) to indicate the number of repetitions. The method 500 may further include encoding the response to the scheduled UL transmission for transmitting over the PDSCH and transmitting the response to the scheduled UL transmission up to as many times as the number of repetitions. The method 500 may also include the transmission comprising a downlink control information (DCI) format 10 with a cyclic redundancy check (CRC) scrambled by a temporary cell-radio network temporary identifier (TC-RNTI).

Figure 6:
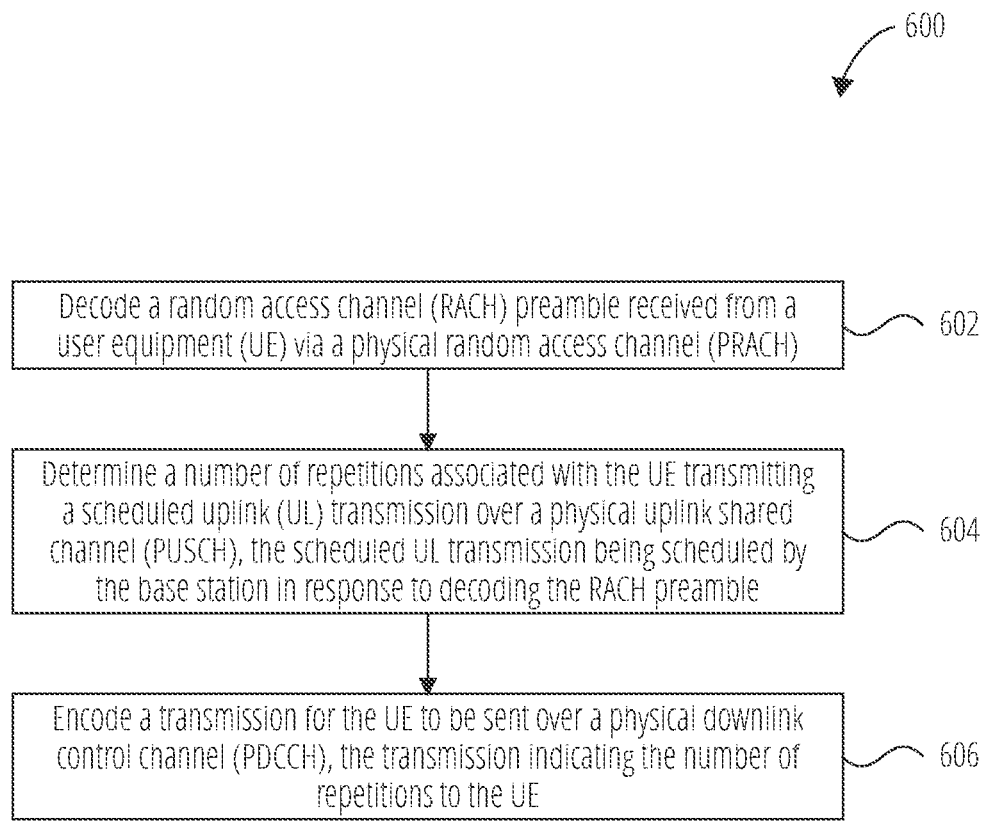
FIG. 6 illustrates a flowchart of a method in accordance with one embodiment.

FIG. 6 illustrates a flowchart of a method 600 for providing a coverage enhancement for a UE comprising an indication of a number of possible repetitions. In block 602, the method 600 decodes a random access channel (RACH) preamble received from a user equipment (UE) via a physical random access channel (PRACH). For instance, the RACH preamble may comprise Msg1 (i.e., step 1) of the RACH procedure. In block 604, the method 600 determines a number of repetitions associated with the UE transmitting a scheduled uplink (UL) transmission over a physical uplink shared channel (PUSCH). For instance, the scheduled UL transmission may comprise Msg3 (i.e., step 3) of the RACH procedure. In another example, the base station (e.g., gNB) may determine that the scheduled UL transmission is to be sent three times. the scheduled UL transmission being scheduled by the base station in response to decoding the RACH preamble. In block 606, the method 600 encodes a transmission for the UE to be sent over a physical downlink control channel (PDCCH). In particular, the transmission may indicate the number of repetitions to the UE.

The method 600 may also include using at least one of one or more hybrid automatic repeat request (HARQ) process number (HPN) bits and a new data indicator (NDI) bit to indicate the number of repetitions. The method 600 may also include using the one or more HPN bits to indicate the number of repetitions when the NDI bit is set to 1. The method 600 may also include using one of two least significant bits (LSB) of hybrid automatic repeat request (HARQ) process number (HPN) bits, two most significant bits (MSB) of the HPN bits, or all of the HPN bits.

Figure 7:
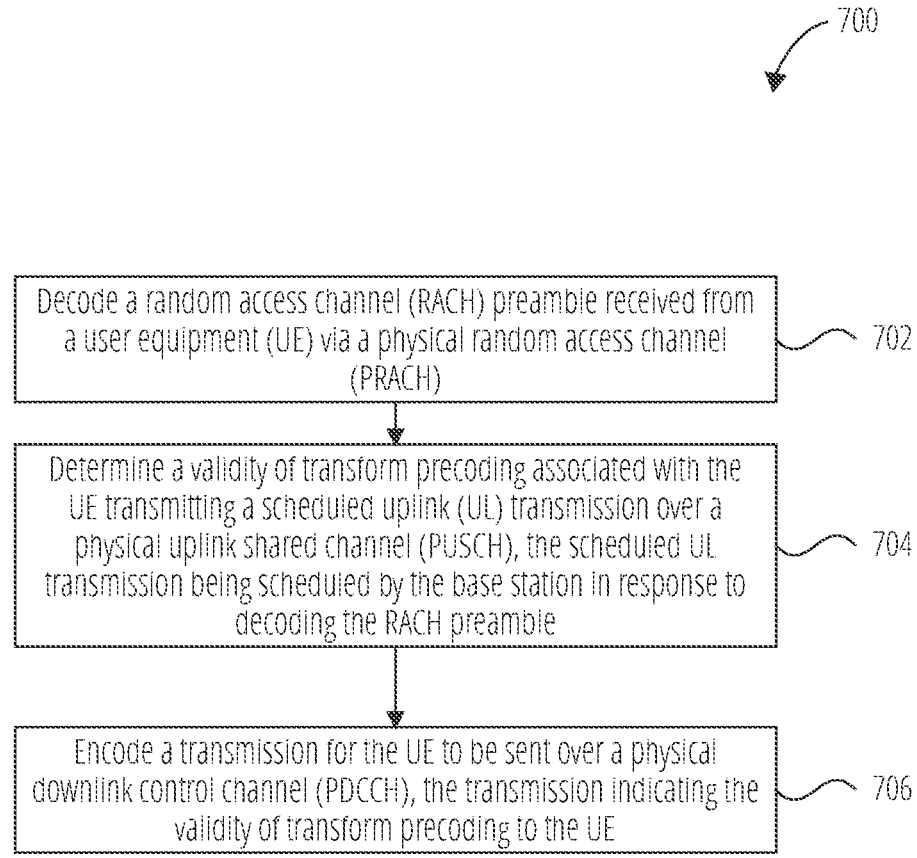
FIG. 7 illustrates a flowchart of a method in accordance with one embodiment.

FIG. 7 illustrates a flowchart of a method 700 for providing a coverage enhancement for a UE comprising an indication of a waveform. In block 702, the method 700 decodes a random access channel (RACH) preamble received from a user equipment (UE) via a physical random access channel (PRACH). For instance, the RACH preamble may comprise Msg1 (i.e., step 1) of the RACH procedure. In block 704, the method 700 determines a validity of transform precoding associated with the UE transmitting a scheduled uplink (UL) transmission over a physical uplink shared channel (PUSCH). For instance, the scheduled UL transmission may be scheduled by the base station in response to decoding the RACH preamble. In block 706, the method 700 encodes a transmission for the UE to be sent over a physical downlink control channel (PDCCH). In particular, the transmission may indicate the validity of transform precoding to the UE.

The method 700 may also include the PUSCH for the scheduled UL transmission being scheduled by random access response (RAR) UL grant. The method 700 may also include indicating that transform precoding is enabled based on a single reserved bit in a first Oct of the RAR. The method 700 may also include the PUSCH for the scheduled UL transmission being scheduled by a downlink control information (DCI) format 0_0 with a cyclic redundancy check (CRC) scrambled by a temporary cell-radio network temporary identifier (TC-RNTI). The method 700 may also include indicating that transform precoding is enabled based on a value of a new data indicator (NDI) bit.

Figure 8:
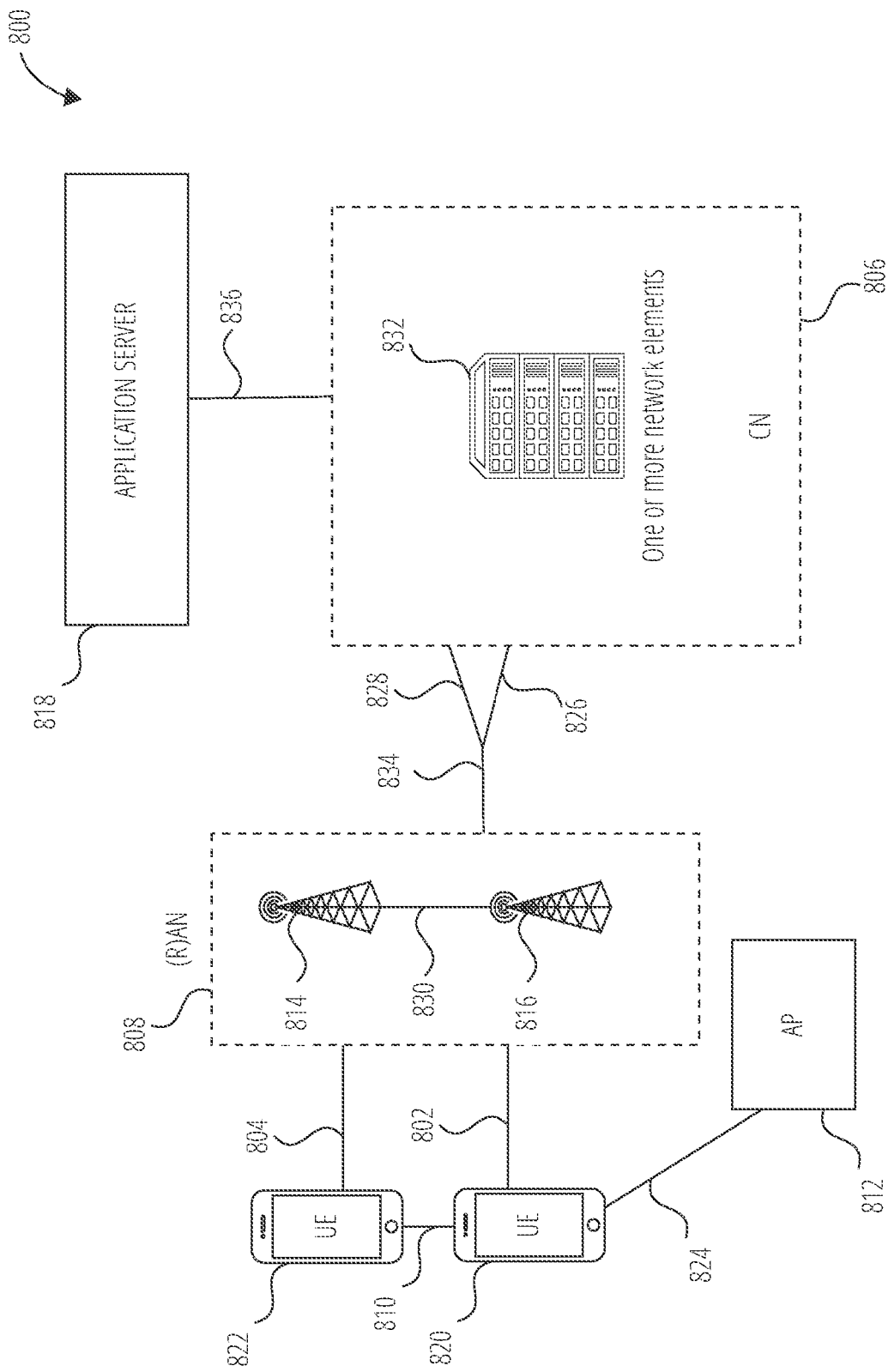
FIG. 8 illustrates a system in accordance with one embodiment.

FIG. 8 illustrates an example architecture of a system 800 of a network, in accordance with various embodiments. The following description is provided for an example system 800 that operates in conjunction with the LTE system standards and 5G or NR system standards as provided by 3GPP technical specifications. However, the example embodiments are not limited in this regard and the described embodiments may apply to other networks that benefit from the principles described herein, such as future 3GPP systems (e.g., Sixth Generation (6G)) systems, IEEE 802.16 protocols (e.g., WMAN, WiMAX, etc.), or the like.

As shown by FIG. 8, the system 800 includes UE 822 and UE 820. In this example, the UE 822 and the UE 820 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices, M2M, IoT devices, and/or the like.

In some embodiments, the UE 822 and/or the UE 820 may be IoT UEs, which may comprise a network access layer designed for low power IoT applications utilizing short-lived UE connections. An IoT UE can utilize technologies such as M2M or MTC for exchanging data with an MTC server or device via a PLMN, ProSe or D2D communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UE 822 and UE 820 may be configured to connect, for example, communicatively couple, with an access node or radio access node (shown as (R)AN 808). In embodiments, the (R)AN 808 may be an NG RAN or a 5G RAN, an E-UTRAN, or a legacy RAN, such as a UTRAN or GERAN. As used herein, the term "NG RAN" or the like may refer to a (R)AN 808 that operates in an NR or 5G system, and the term "E-UTRAN" or the like may refer to a (R)AN 808 that operates in an LTE or 4G system. The UE 822 and UE 820 utilize connections (or channels) (shown as connection 804 and connection 802, respectively), each of which comprises a physical communications interface or layer (discussed in further detail below).

In this example, the connection 804 and connection 802 are air interfaces to enable communicative coupling, and can be consistent with cellular communications protocols, such as a GSM protocol, a CDMA network protocol, a PTT protocol, a POC protocol, a UMTS protocol, a 3GPP LTE protocol, a 5G protocol, a NR protocol, and/or any of the other communications protocols discussed herein. In embodiments, the UE 822 and UE 820 may directly exchange communication data via a ProSe interface 810. The ProSe interface 810 may alternatively be referred to as a sidelink (SL) interface 110 and may comprise one or more logical channels, including but not limited to a PSCCH, a PSSCH, a PSDCH, and a PSBCH.

The UE 820 is shown to be configured to access an AP 812 (also referred to as "WLAN node," "WLAN," "WLAN Termination," "WT" or the like) via connection 824. The connection 824 can comprise a local wireless connection, such as a connection consistent with any IEEE 802.11 protocol, wherein the AP 812 would comprise a wireless fidelity (Wi-Fi®) router. In this example, the AP 812 may be connected to the Internet without connecting to the core network of the wireless system (described in further detail below). In various embodiments, the UE 820, (R)AN 808, and AP 812 may be configured to utilize LWA operation and/or LWIP operation. The LWA operation may involve the UE 820 in RRC_CONNECTED being configured by the RAN node 814 or the RAN node 816 to utilize radio resources of LTE and WLAN. LWIP operation may involve the UE 820 using WLAN radio resources (e.g., connection 824) via IPsec protocol tunneling to authenticate and encrypt packets (e.g., IP packets) sent over the connection 824. IPsec tunneling may include encapsulating the entirety of original IP packets and adding a new packet header, thereby protecting the original header of the IP packets.

The (R)AN 808 can include one or more AN nodes, such as RAN node 814 and RAN node 816, that enable the connection 804 and connection 802. As used herein, the terms "access node," "access point," or the like may describe equipment that provides the radio baseband functions for data and/or voice connectivity between a network and one or more users. These access nodes can be referred to as BS, gNBs. RAN nodes, cNBs, NodeBs, RSUs TRxPs or TRPs, and so forth, and can comprise ground stations (e.g., terrestrial access points) or satellite stations providing coverage within a geographic area (e.g., a cell). As used herein, the term "NG RAN node" or the like may refer to a RAN node that operates in an NR or 5G system (for example, a gNB), and the term "E-UTRAN node" or the like may refer to a RAN node that operates in an LTE or 4G system 800 (e.g., an eNB). According to various embodiments, the RAN node 814 or RAN node 816 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some embodiments, all or parts of the RAN node 814 or RAN node 816 may be implemented as one or more software entities running on server computers as part of a virtual network, which may be referred to as a CRAN and/or a virtual baseband unit pool (vBBUP). In these embodiments, the CRAN or vBBUP may implement a RAN function split, such as a PDCP split wherein RRC and PDCP layers are operated by the CRAN/vBBUP and other L2 protocol entities are operated by individual RAN nodes (e.g., RAN node 814 or RAN node 816); a MAC/PHY split wherein RRC, PDCP, RLC, and MAC layers are operated by the CRAN/vBBUP and the PHY layer is operated by individual RAN nodes (e.g., RAN node 814 or RAN node 816); or a "lower PHY" split wherein RRC, PDCP, RLC, MAC layers and upper portions of the PHY layer are operated by the CRAN/vBBUP and lower portions of the PHY layer are operated by individual RAN nodes. This virtualized framework allows the freed-up processor cores of the RAN node 814 or RAN node 816 to perform other virtualized applications. In some implementations, an individual RAN node may represent individual gNB-DUs that are connected to a gNB-CU via individual F1 interfaces (not shown by FIG. 8). In these implementations, the gNB-DUs may include one or more remote radio heads or RFEMs, and the gNB-CU may be operated by a server that is located in the (R)AN 808 (not shown) or by a server pool in a similar manner as the CRAN/vBBUP. Additionally, or alternatively, one or more of the RAN node 814 or RAN node 816 may be next generation eNBs (ng-eNBs), which are RAN nodes that provide E-UTRA user plane and control plane protocol terminations toward the UE 822 and UE 820, and are connected to an SGC via an NG interface (discussed infra). In V2X scenarios one or more of the RAN node 814 or RAN node 816 may be or act as RSUs.

The term "Road Side Unit" or "RSU" may refer to any transportation infrastructure entity used for V2X communications. An RSU may be implemented in or by a suitable RAN node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like. In one example, an RSU is a computing device coupled with radio frequency circuitry located on a roadside that provides connectivity support to passing vehicle UEs (vUEs). The RSU may also include internal data storage circuitry to store intersection map geometry, traffic statistics, media, as well as applications/software to sense and control ongoing vehicular and pedestrian traffic. The RSU may operate on the 5.9 GHz Direct Short Range Communications (DSRC) band to provide very low latency communications required for high speed events, such as crash avoidance, traffic warnings, and the like. Additionally, or alternatively, the RSU may operate on the cellular V2X band to provide the aforementioned low latency communications, as well as other cellular communications services. Additionally, or alternatively, the RSU may operate as a Wi-Fi hotspot (2.4 GHz band) and/or provide connectivity to one or more cellular networks to provide uplink and downlink communication. The computing device(s) and some or all of the radio frequency circuitry of the RSU may be packaged in a weatherproof enclosure suitable for outdoor installation, and may include a network interface controller to provide a wired connection (e.g., Ethernet) to a traffic signal controller and/or a backhaul network.

The RAN node 814 and/or the RAN node 816 can terminate the air interface protocol and can be the first point of contact for the UE 822 and UE 820. In some embodiments, the RAN node 814 and/or the RAN node 816 can fulfill various logical functions for the (R)AN 808 including, but not limited to, radio network controller (RNC) functions such as radio bearer management, uplink and downlink dynamic radio resource management and data packet scheduling, and mobility management.

In embodiments, the UE 822 and UE 820 can be configured to communicate using OFDM communication signals with each other or with the RAN node 814 and/or the RAN node 816 over a multicarrier communication channel in accordance with various communication techniques, such as, but not limited to, an OFDMA communication technique (e.g., for downlink communications) or a SC-FDMA communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from the RAN node 814 and/or the RAN node 816 to the UE 822 and UE 820, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

According to various embodiments, the UE 822 and UE 820 and the RAN node 814 and/or the RAN node 816 communicate data (for example, transmit and receive) over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band.

To operate in the unlicensed spectrum, the UE 822 and UE 820 and the RAN node 814 or RAN node 816 may operate using LAA, eLAA, and/or feLAA mechanisms. In these implementations, the UE 822 and UE 820 and the RAN node 814 or RAN node 816 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

LBT is a mechanism whereby equipment (for example, UE 822 and UE 820, RAN node 814 or RAN node 816, etc.) senses a medium (for example, a channel or carrier frequency) and transmits when the medium is sensed to be idle (or when a specific channel in the medium is sensed to be unoccupied). The medium sensing operation may include CCA, which utilizes at least ED to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing RF energy across an intended transmission band for a period of time and comparing the sensed RF energy to a predefined or configured threshold.

Typically, the incumbent systems in the 5 GHz band are WLANs based on IEEE 802.11 technologies. WLAN employs a contention-based channel access mechanism, called CSMA/CA Here, when a WLAN node (e.g., a mobile station (MS) such as UE 822, AP 812, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the CWS, which is increased exponentially upon the occurrence of collision and reset to a minimum value when the transmission succeeds. The LBT mechanism designed for LAA is somewhat similar to the CSMA/CA of WLAN. In some implementations, the LBT procedure for DL or UL transmission bursts including PDSCH or PUSCH transmissions, respectively, may have an LAA contention window that is variable in length between X and Y ECCA slots, where X and Y are minimum and maximum values for the CWSs for LAA. In one example, the minimum CWS for an LAA transmission may be 9 microseconds (μs): however, the size of the CWS and a MCOT (for example, a transmission burst) may be based on governmental regulatory requirements.

The LAA mechanisms are built upon CA technologies of LTE-Advanced systems. In CA, each aggregated carrier is referred to as a CC. A CC may have a bandwidth of 1.4, 3, 5, 10, 15 or 20 MHz and a maximum of five CCs can be aggregated, and therefore, a maximum aggregated bandwidth is 100 MHz. In FDD systems, the number of aggregated carriers can be different for DL and UL, where the number of UL CCs is equal to or lower than the number of DL component carriers. In some cases, individual CCs can have a different bandwidth than other CCs. In TDD systems, the number of CCs as well as the bandwidths of each CC is usually the same for DL and UL.

CA also comprises individual serving cells to provide individual CCs. The coverage of the serving cells may differ, for example, because CCs on different frequency bands will experience different pathloss. A primary service cell or PCell may provide a PCC for both UL and DL, and may handle RRC and NAS related activities. The other serving cells are referred to as SCells, and each SCell may provide an individual SCC for both UL and DL. The SCCs may be added and removed as required, while changing the PCC may require the UE 822 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH carries user data and higher-layer signaling to the UE 822 and UE 820. The PDCCH carries information about the transport format and resource allocations related to the PDSCH channel, among other things. It may also inform the UE 822 and UE 820 about the transport format, resource allocation, and HARQ information related to the uplink shared channel. Typically, downlink scheduling (assigning control and shared channel resource blocks to the UE 820 within a cell) may be performed at any of the RAN node 814 or RAN node 816 based on channel quality information fed back from any of the UE 822 and UE 820. The downlink resource assignment information may be sent on the PDCCH used for (e.g., assigned to) each of the UE 822 and UE 820.

The PDCCH uses CCEs to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as REGs. Four Quadrature Phase Shift Keying (QPSK) symbols may be mapped to each REG. The PDCCH can be transmitted using one or more CCEs, depending on the size of the DCI and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an EPDCCH that uses PDSCH resources for control information transmission. The EPDCCH may be transmitted using one or more ECCEs. Similar to above, each ECCE may correspond to nine sets of four physical resource elements known as an EREGs. An ECCE may have other numbers of EREGs in some situations.

The RAN node 814 or RAN node 816 may be configured to communicate with one another via interface 830. In embodiments where the system 800 is an LTE system (e.g., when CN 806 is an EPC), the interface 830 may be an X2 interface. The X2 interface may be defined between two or more RAN nodes (e.g., two or more eNBs and the like) that connect to an EPC, and/or between two eN Bs connecting to the EPC. In some implementations, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a MeNB to an SeNB; information about successful in sequence delivery of PDCP PDUs to a UE 822 from an SeNB for user data, information of PDCP PDUs that were not delivered to a UE 822; information about a current minimum desired buffer size at the Sc NB for transmitting to the UE user data; and the like. The X2-C may provide intra-LTE access mobility functionality, including context transfers from source to target eNBs, user plane transport control, etc.; load management functionality; as well as inter-cell interference coordination functionality.

In embodiments where the system 800 is a 5G or NR system (e.g., when CN 806 is an 5GC), the interface 830 may be an Xn interface. The Xn interface is defined between two or more RAN nodes (e.g., two or more gNBs and the like) that connect to 5GC, between a RAN node 814 (e.g., a gNB) connecting to 5GC and an eNB, and/or between two eNBs connecting to 5GC (e.g. CN 806). In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 822 in a connected mode (e.g., CM-CONNECTED) including functionality to manage the UE mobility for connected mode between one or more RAN node 814 or RAN node 816. The mobility support may include context transfer from an old (source) serving RAN node 814 to new (target) serving RAN node 816; and control of user plane tunnels between old (source) serving RAN node 814 to new (target) serving RAN node 816. A protocol stack of the Xn-U may include a transport network layer built on Internet Protocol (IP) transport layer, and a GTP—U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer, point-to-point transmission is used to deliver the signaling PDUs. In other implementations, the Xn-U protocol stack and/or the Xn-C protocol stack may be same or similar to the user plane and/or control plane protocol stack(s) shown and described herein.

The (R)AN 808 is shown to be communicatively coupled to a core network-in this embodiment, CN 806. The CN 806 may comprise one or more network elements 832, which are configured to offer various data and telecommunications services to customers/subscribers (e.g., users of UE 822 and UE 820) who are connected to the CN 806 via the (R)AN 808. The components of the CN 806 may be implemented in one physical node or separate physical nodes including components to read and execute instructions from a machine-readable or computer-readable medium (e.g., a non-transitory machine-readable storage medium). In some embodiments, NFV may be utilized to virtualize any or all of the above-described network node functions via executable instructions stored in one or more computer-readable storage mediums (described in further detail below). A logical instantiation of the CN 806 may be referred to as a network slice, and a logical instantiation of a portion of the CN 806 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Generally, an application server 818 may be an element offering applications that use IP bearer resources with the core network (e.g., UMTS PS domain, LTE PS data services, etc.). The application server 818 can also be configured to support one or more communication services (e.g., VoIP sessions, PTT sessions, group communication sessions, social networking services, etc.) for the UE 822 and UE 820 via the EPC. The application server 818 may communicate with the CN 806 through an IP communications interface 836.

In embodiments, the CN 806 may be an 5GC, and the (R)AN 116 may be connected with the CN 806 via an NG interface 834. In embodiments, the NG interface 834 may be split into two parts, an NG user plane (NG-U) interface 826, which carries traffic data between the RAN node 814 or RAN node 816 and a UPF, and the S1 control plane (NG-C) interface 828, which is a signaling interface between the RAN node 814 or RAN node 816 and AMFs.

In embodiments, the CN 806 may be a 5G CN, while in other embodiments, the CN 806 may be an EPC). Where CN 806 is an EPC, the (R)AN 116 may be connected with the CN 806 via an S1 interface 834. In embodiments, the S1 interface 834 may be split into two parts, an S1 user plane (S1-U) interface 826, which carries traffic data between the RAN node 814 or RAN node 816 and the S-GW, and the S1-MME interface 828, which is a signaling interface between the RAN node 814 or RAN node 816 and MMEs.

Figure 9:
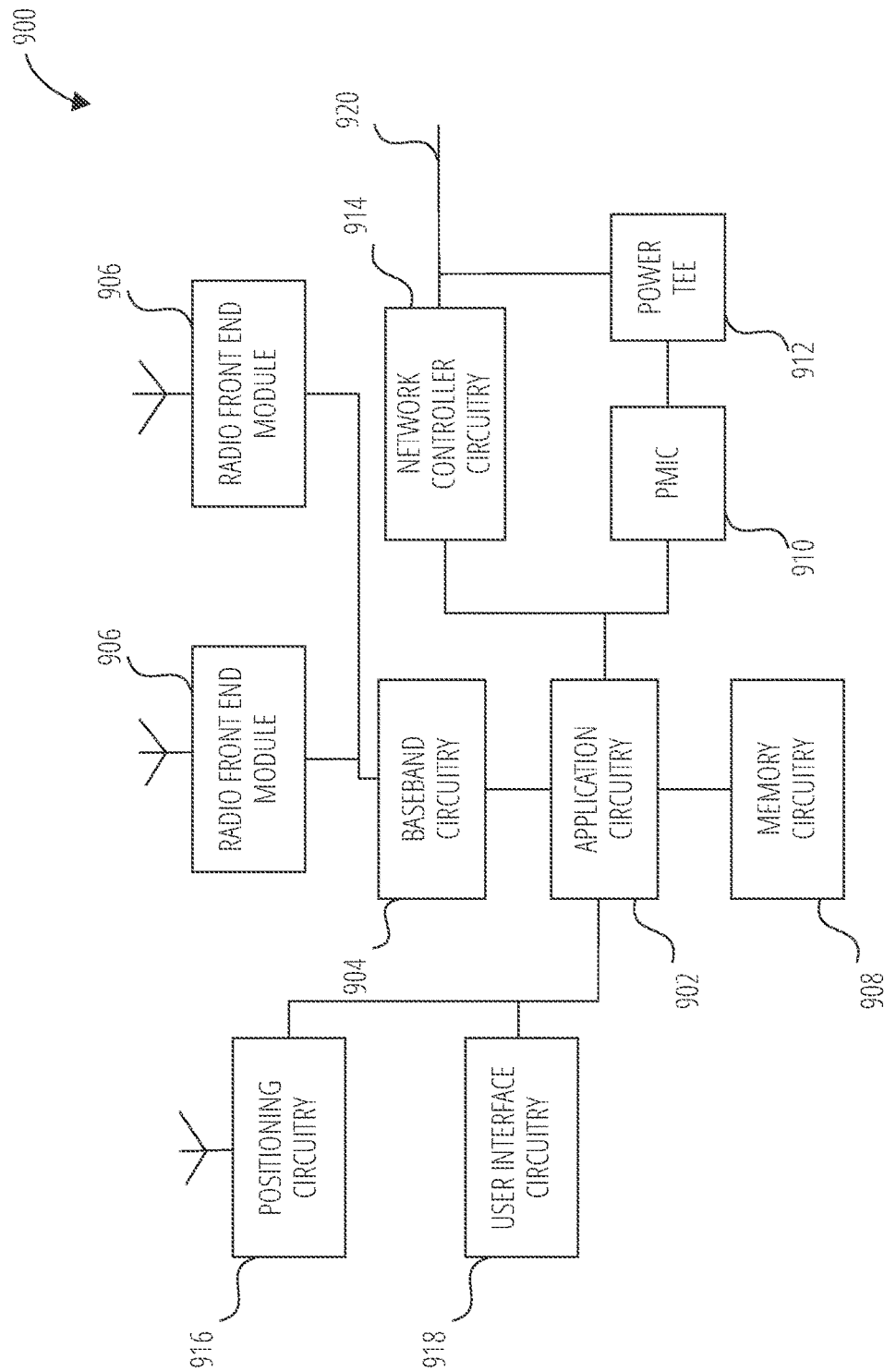
FIG. 9 illustrates an infrastructure equipment in accordance with one embodiment.

FIG. 9 illustrates an example of infrastructure equipment 900 in accordance with various embodiments. The infrastructure equipment 900 may be implemented as a base station, radio head, RAN node, AN, application server, and/or any other element/device discussed herein. In other examples, the infrastructure equipment 900 could be implemented in or by a UE.

The infrastructure equipment 900 includes application circuitry 902, baseband circuitry 904, one or more radio front end module 906 (RFEM), memory circuitry 908, power management integrated circuitry (shown as PMIC 910), power tee circuitry 912, network controller circuitry 914, network interface connector 920, satellite positioning circuitry 916, and user interface circuitry 918. In some embodiments, the device infrastructure equipment 900 may include additional elements such as, for example, memory/storage, display, camera, sensor, or input/output (I/O) interface. In other embodiments, the components described below may be included in more than one device. For example, said circuitries may be separately included in more than one device for CRAN, vBBU, or other like implementations. Application circuitry 902 includes circuitry such as, but not limited to one or more processors (or processor cores), cache memory, and one or more of low drop-out voltage regulators (LDOs), interrupt controllers, serial interfaces such as SPI, I$^2$C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 902 may be coupled with or may include memory/storage elements and may be configured to execute instructions stored in the memory/storage to enable various applications or operating systems to run on the infrastructure equipment 900. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 902 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or any suitable combination thereof. In some embodiments, the application circuitry 902 may comprise, or may be, a special-purpose processor/controller to operate according to the various embodiments herein. As examples, the processor(s) of application circuitry 902 may include one or more Intel PentiumV, Corek, or Xeonk processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium™, Inc., a MIPS-based design from MIPS Technologies. Inc. such as MIPS Warrior P-class processors; and/or the like. In some embodiments, the infrastructure equipment 900 may not utilize application circuitry 902, and instead may include a special-purpose processor/controller to process IP data received from an EPC or 5GC, for example.

In some implementations, the application circuitry 902 may include one or more hardware accelerators, which may be microprocessors, programmable processing devices, or the like. The one or more hardware accelerators may include, for example, computer vision (CV) and/or deep learning (DL) accelerators. As examples, the programmable processing devices may be one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such implementations, the circuitry of application circuitry 902 may comprise logic blocks or logic fabric, and other interconnected resources that may be programmed to perform various functions, such as the procedures, methods, functions, etc. of the various embodiments discussed herein. In such embodiments, the circuitry of application circuitry 902 may include memory cells (e.g., erasable programmable read-only memory (EPROM), electrically erasable programmable read-only memory (EEPROM), flash memory, static memory (e.g., static random access memory (SRAM), antifuses, etc.)) used to store logic blocks, logic fabric, data, etc. in look-up-tables (LUTs) and the like. The baseband circuitry 904 may be implemented, for example, as a solder-down substrate including one or more integrated circuits, a single packaged integrated circuit soldered to a main circuit board or a multi-chip module containing two or more integrated circuits.

The user interface circuitry 918 may include one or more user interfaces designed to enable user interaction with the infrastructure equipment 900 or peripheral component interfaces designed to enable peripheral component interaction with the infrastructure equipment 900. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The radio front end module 906 may comprise a millimeter wave (mmWave) radio front end module (RFEM) and one or more sub-mmWave radio frequency integrated circuits (RFICs). In some implementations, the one or more sub-mmWave RFICs may be physically separated from the mmWave RFEM. The RFICs may include connections to one or more antennas or antenna arrays, and the RFEM may be connected to multiple antennas. In alternative implementations, both mmWave and sub-mmWave radio functions may be implemented in the same physical radio front end module 906, which incorporates both mmWave antennas and sub-mmWave.

The memory circuitry 908 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. The memory circuitry 908 may be implemented as one or more of solder down packaged integrated circuits, socketed memory modules and plug-in memory cards.

The PMIC 910 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 912 may provide for electrical power drawn from a network cable to provide both power supply and data connectivity to the infrastructure equipment 900 using a single cable.

The network controller circuitry 914 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 900 via network interface connector 920 using a physical connection, which may be electrical (commonly referred to as a "copper interconnect"), optical, or wireless. The network controller circuitry 914 may include one or more dedicated processors and/or FPGAs to communicate using one or more of the aforementioned protocols. In some implementations, the network controller circuitry 914 may include multiple controllers to provide connectivity to other networks using the same or different protocols.

The positioning circuitry 916 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo System, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 916 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 916 may include a Micro-Technology for Positioning, Navigation, and Timing (Micro-PNT) IC that uses a master timing clock to perform position tracking/estimation without GNSS assistance. The positioning circuitry 916 may also be part of, or interact with, the baseband circuitry 904 and/or radio front end module 906 to communicate with the nodes and components of the positioning network. The positioning circuitry 916 may also provide position data and/or time data to the application circuitry 902, which may use the data to synchronize operations with various infrastructure, or the like. The components shown by FIG. 9 may communicate with one another using interface circuitry, which may include any number of bus and/or interconnect (IX) technologies such as industry standard architecture (ISA), extended ISA (EISA), peripheral component interconnect (PCI), peripheral component interconnect extended (PCix), PCI express (PCic), or any number of other technologies. The bus/IX may be a proprietary bus, for example, used in a SoC based system. Other bus/IX systems may be included, such as an I$^2$C interface, an SPI interface, point to point interfaces, and a power bus, among others.

Figure 10:
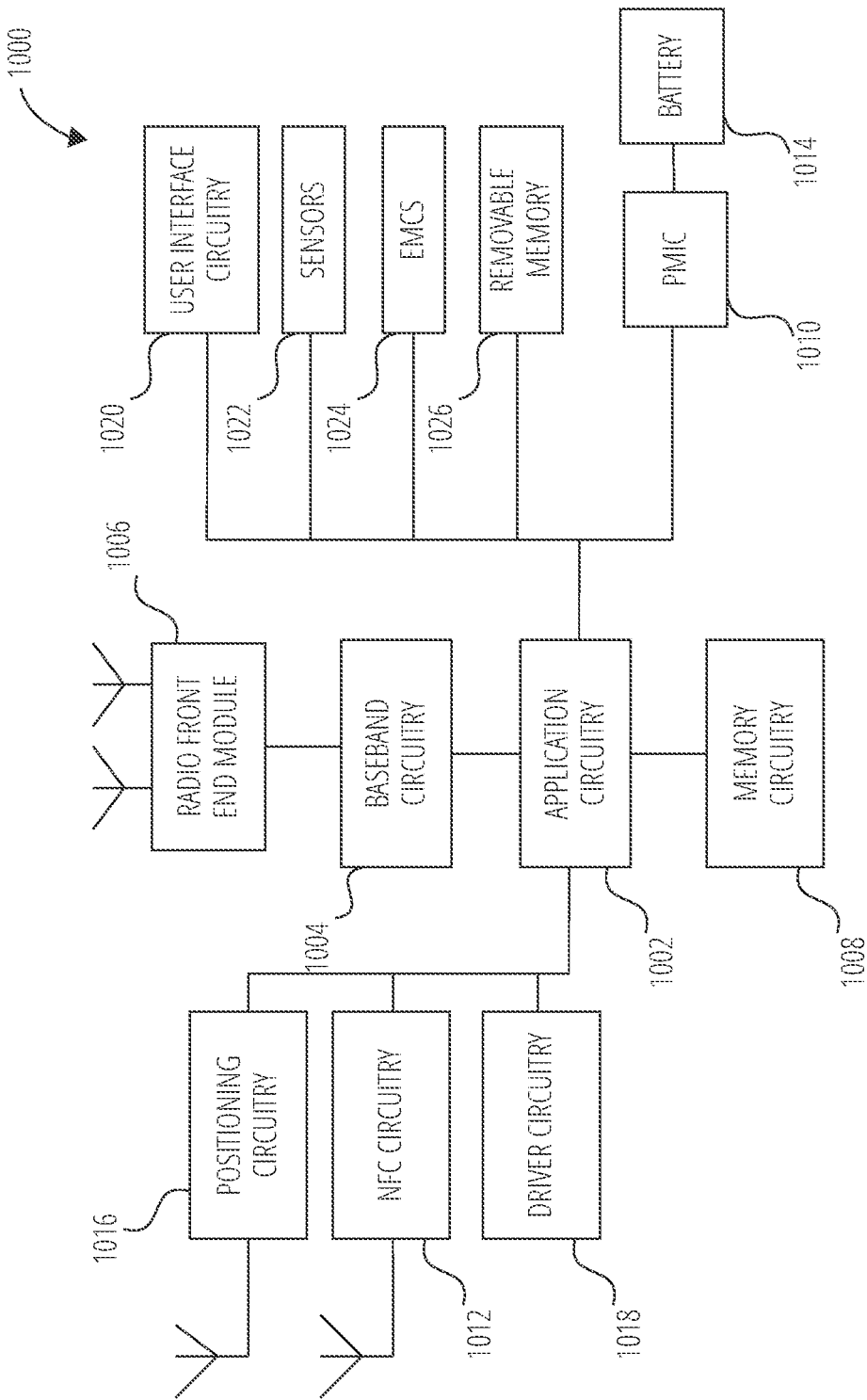
FIG. 10 illustrates a platform in accordance with one embodiment.

FIG. 10 illustrates an example of a platform 1000 in accordance with various embodiments. In embodiments, the computer platform 1000 may be suitable for use as UEs, application servers, and/or any other element/device discussed herein. The platform 1000 may include any combinations of the components shown in the example. The components of platform 1000 may be implemented as integrated circuits (ICs), portions thereof, discrete electronic devices, or other modules, logic, hardware, software, firmware, or a combination thereof adapted in the computer platform 1000, or as components otherwise incorporated within a chassis of a larger system. The block diagram of FIG. 10 is intended to show a high level view of components of the computer platform 1000. However, some of the components shown may be omitted, additional components may be present, and different arrangement of the components shown may occur in other implementations.

Application circuitry 1002 includes circuitry such as, but not limited to one or more processors (or processor cores), cache memory, and one or more of LDOs, interrupt controllers, serial interfaces such as SPI, I$^2$C or universal programmable serial interface module, RTC, timer-counters including interval and watchdog timers, general purpose IO, memory card controllers such as SD MMC or similar, USB interfaces. MIPI interfaces, and JTAG test access ports. The processors (or cores) of the application circuitry 1002 may be coupled with or may include memory/storage elements and may be configured to execute instructions stored in the memory/storage to enable various applications or operating systems to run on the platform 1000. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 1002 may include, for example, one or more processor cores, one or more application processors, one or more GPUs, one or more RISC processors, one or more ARM processors, one or more CISC processors, one or more DSP, one or more FPGAs, one or more PLDs, one or more ASICs, one or more microprocessors or controllers, a multithreaded processor, an ultra-low voltage processor, an embedded processor, some other known processing element, or any suitable combination thereof. In some embodiments, the application circuitry 1002 may comprise, or may be, a special-purpose processor/controller to operate according to the various embodiments herein.

As examples, the processor(s) of application circuitry 1002 may include an Intel® Architecture Core™ based processor, such as a Quark™, an Atom™, an i3, an i5, an i7, or an MCU-class processor, or another such processor available from Intel® Corporation. The processors of the application circuitry 1002 may also be one or more of Advanced Micro Devices (AMD) Ryzen® processor(s) or Accelerated Processing Units (APUs); AS-A9 processor(s) from Apple® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; or the like. In some implementations, the application circuitry 1002 may be a part of a system on a chip (SoC) in which the application circuitry 1002 and other components are formed into a single integrated circuit, or a single package, such as the Edison™ or Galileo™ SoC boards from Intel® Corporation.

Additionally or alternatively, application circuitry 1002 may include circuitry such as, but not limited to, one or more a field-programmable devices (FPDs) such as FPGAs and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 1002 may comprise logic blocks or logic fabric, and other interconnected resources that may be programmed to perform various functions, such as the procedures, methods, functions, etc. of the various embodiments discussed herein. In such embodiments, the circuitry of application circuitry 1002 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up tables (LUTs) and the like.

The baseband circuitry 1004 may be implemented, for example, as a solder-down substrate including one or more integrated circuits, a single packaged integrated circuit soldered to a main circuit board or a multi-chip module containing two or more integrated circuits.

The radio front end module 1006 may comprise a millimeter wave (mmWave) radio front end module (RFEM) and one or more sub-mmWave radio frequency integrated circuits (RFICs). In some implementations, the one or more sub-mmWave RFICs may be physically separated from the mmWave RFEM. The RFICs may include connections to one or more antennas or antenna arrays, and the RFEM may be connected to multiple antennas. In alternative implementations, both mmWave and sub-mmWave radio functions may be implemented in the same physical radio front end module 1006, which incorporates both mmWave antennas and sub-mmWave.

The memory circuitry 1008 may include any number and type of memory devices used to provide for a given amount of system memory. As examples, the memory circuitry 1008 may include one or more of volatile memory including random access memory (RAM), dynamic RAM (DRAM)

and/or synchronous dynamic RAM (SD RAM), and nonvolatile memory (NVM) including high-speed electrically erasable memory (commonly referred to as Flash memory), phase change random access memory (PRAM), magnetoresistive random access memory (MRAM), etc. The memory circuitry 1008 may be developed in accordance with a Joint Electron Devices Engineering Council (JEDEC) low power double data rate (LPDDR)-based design, such as LPDDR2, LPDDR3, LPDDR4, or the like. Memory circuitry 1008 may be implemented as one or more of solder down packaged integrated circuits, single die package (SDP), dual die package (DDP) or quad die package (Q17P), socketed memory modules, dual inline memory modules (DIMMs) including microDIMMs or MiniDIMMs, and/or soldered onto a motherboard via a ball grid array (BGA). In low power implementations, the memory circuitry 1008 maybe on-die memory or registers associated with the application circuitry 1002. To provide for persistent storage of information such as data, applications, operating systems and so forth, memory circuitry 1008 may include one or more mass storage devices, which may include, inter alia, a solid state disk drive (SSDD), hard disk drive (HDD), a microHDD, resistance change memories, phase change memories, holographic memories, or chemical memories, among others. For example, the computer platform 1000 may incorporate the three-dimensional (3D) cross-point (XPOINT) memories from Intel® and Micron®.

The removable memory 1026 may include devices, circuitry, enclosures/housings, ports or receptacles, etc. used to couple portable data storage devices with the platform 1000. These portable data storage devices may be used for mass storage purposes, and may include, for example, flash memory cards (e.g., Secure Digital (SD) cards, microSD cards, xD picture cards, and the like), and USB flash drives, optical discs, external HDDs, and the like.

The platform 1000 may also include interface circuitry (not shown) that is used to connect external devices with the platform 1000. The external devices connected to the platform 1000 via the interface circuitry include sensors 1022 and electro-mechanical components (shown as EMCs 1024), as well as removable memory devices coupled to removable memory 1026.

The sensors 1022 include devices, modules, or subsystems whose purpose is to detect events or changes in its environment and send the information (sensor data) about the detected events to some other a device, module, subsystem, etc. Examples of such sensors include, inter alia, inertia measurement units (IMUs) comprising accelerometers, gyroscopes, and/or magnetometers: microelectromechanical systems (MEMS) or nanoelectromechanical systems (NEMS) comprising 3-axis accelerometers, 3-axis gyroscopes, and/or magnetometers; level sensors: flow sensors: temperature sensors (e.g., thermistors); pressure sensors; barometric pressure sensors: gravimeters; altimeters; image capture devices (e.g., cameras or lensless apertures); light detection and ranging (LiDAR) sensors; proximity sensors (e.g., infrared radiation detector and the like), depth sensors, ambient light sensors, ultrasonic transceivers; microphones or other like audio capture devices; etc.

EMCs 1024 include devices, modules, or subsystems whose purpose is to enable platform 1000 to change its state, position, and/or orientation, or move or control a mechanism or (sub)system. Additionally, EMCs 1024 may be configured to generate and send messages/signaling to other components of the platform 1000 to indicate a current state of the EMCs 1024. Examples of the EMCs 1024 include one or more power switches, relays including electromechanical relays (EMRs) and/or solid state relays (SSRs), actuators (e.g., valve actuators, etc.), an audible sound generator, a visual warning device, motors (e.g., DC motors, stepper motors, etc.), wheels, thrusters, propellers, claws, clamps, hooks, and/or other like electro-mechanical components. In embodiments, platform 1000 is configured to operate one or more EMCs 1024 based on one or more captured events and/or instructions or control signals received from a service provider and/or various clients. In some implementations, the interface circuitry may connect the platform 1000 with positioning circuitry 1016. The positioning circuitry 1016 includes circuitry to receive and decode signals transmitted/broadcasted by a positioning network of a GNSS. Examples of navigation satellite constellations (or GNSS) include United States' GPS, Russia's GLONASS, the European Union's Galileo system, China's BeiDou Navigation Satellite System, a regional navigation system or GNSS augmentation system (e.g., NAVIC), Japan's QZSS, France's DORIS, etc.), or the like. The positioning circuitry 1016 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 1016 may include a Micro-PNT IC that uses a master timing clock to perform position tracking/estimation without GNSS assistance. The positioning circuitry 1016 may also be part of, or interact with, the baseband circuitry 1004 and/or radio front end module 1006 to communicate with the nodes and components of the positioning network. The positioning circuitry 1016 may also provide position data and/or time data to the application circuitry 1002, which may use the data to synchronize operations with various infrastructure (e.g., radio base stations), for turn-by-turn navigation applications, or the like.

In some implementations, the interface circuitry may connect the platform 1000 with Near-Field Communication circuitry (shown as NFC circuitry 1012). The NFC circuitry 1012 is configured to provide contactless, short-range communications based on radio frequency identification (RFID) standards, wherein magnetic field induction is used to enable communication between NFC circuitry 1012 and NFC-enabled devices external to the platform 1000 (e.g., an "NFC touchpoint"). NFC circuitry 1012 comprises an NFC controller coupled with an antenna element and a processor coupled with the NFC controller. The NFC controller may be a chip/IC providing NFC functionalities to the NFC circuitry 1012 by executing NFC controller firmware and an NFC stack The NFC stack may be executed by the processor to control the NFC controller, and the NFC controller firmware may be executed by the NFC controller to control the antenna element to emit short-range RF signals. The RF signals may power a passive NFC tag (e.g., a microchip embedded in a sticker or wristband) to transmit stored data to the NFC circuitry 1012, or initiate data transfer between the NFC circuitry 1012 and another active NFC device (e.g., a smartphone or an NFC-enabled POS terminal) that is proximate to the platform 1000.

The driver circuitry 1018 may include software and hardware elements that operate to control particular devices that are embedded in the platform 1000, attached to the platform 1000, or otherwise communicatively coupled with the platform 1000. The driver circuitry 1018 may include individual drivers allowing other components of the platform 1000 to interact with or control various input/output (I/O) devices that may be present within, or connected to, the platform 1000. For example, driver circuitry 1018 may include a display driver to control and allow access to a display device, a touchscreen driver to control and allow access to a touchscreen interface of the platform 1000, sensor drivers to obtain sensor readings of sensors 1022 and control and allow access to sensors 1022, EMC drivers to obtain actuator positions of the EMCs 1024 and/or control and allow access to the EMCs 1024, a camera driver to control and allow access to an embedded image capture device, audio drivers to control and allow access to one or more audio devices.

The power management integrated circuitry (shown as PMIC 1010) (also referred to as "power management circuitry") may manage power provided to various components of the platform 1000. In particular, with respect to the baseband circuitry 1004, the PMIC 1010 may control power-source selection, voltage scaling, battery charging, or DC-to-DC conversion. The PMIC 1010 may often be included when the platform 1000 is capable of being powered by a battery 1014, for example, when the device is included in a UE.

In some embodiments, the PMIC 1010 may control, or otherwise be part of, various power saving mechanisms of the platform 1000. For example, if the platform 1000 is in an RRC_Connected state, where it is still connected to the RAN node as it expects to receive traffic shortly, then it may enter a state known as Discontinuous Reception Mode (DRX) after a period of inactivity. During this state, the platform 1000 may power down for brief intervals of time and thus save power. If there is no data traffic activity for an extended period of time, then the platform 1000 may transition off to an RRC_Idle state, where it disconnects from the network and does not perform operations such as channel quality feedback, handover, etc. The platform 1000 goes into a very low power state and it performs paging where again it periodically wakes up to listen to the network and then powers down again. The platform 1000 may not receive data in this state, in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 1014 may power the platform 1000, although in some examples the platform 1000 may be mounted deployed in a fixed location, and may have a power supply coupled to an electrical grid. The battery 1014 may be a lithium ion battery, a metal-air battery, such as a zinc-air battery, an aluminum-air battery, a lithium-air battery, and the like. In some implementations, such as in V2X applications, the battery 1014 may be a typical lead-acid automotive battery.

In some implementations, the battery 1014 may be a "smart battery," which includes or is coupled with a Battery Management System (BMS) or battery monitoring integrated circuitry. The BMS may be included in the platform 1000 to track the state of charge (SoCh) of the battery 1014. The BMS may be used to monitor other parameters of the battery 1014 to provide failure predictions, such as the state of health (SoH) and the state of function (SoF) of the battery 1014. The BMS may communicate the information of the battery 1014 to the application circuitry 1002 or other components of the platform 1000. The BMS may also include an analog-to-digital (ADC) convertor that allows the application circuitry 1002 to directly monitor the voltage of the battery 1014 or the current flow from the battery 1014. The battery parameters may be used to determine actions that the platform 1000 may perform, such as transmission frequency, network operation, sensing frequency, and the like.

A power block, or other power supply coupled to an electrical grid may be coupled with the BMS to charge the battery 1014. In some examples, the power block may be replaced with a wireless power receiver to obtain the power wirelessly, for example, through a loop antenna in the computer platform 1000. In these examples, a wireless battery charging circuit may be included in the BMS. The specific charging circuits chosen may depend on the size of the battery 1014, and thus, the current required. The charging may be performed using the Airfuel standard promulgated by the Airfuel Alliance, the Qi wireless charging standard promulgated by the Wireless Power Consortium, or the Rezence charging standard promulgated by the Alliance for Wireless Power, among others.

User interface circuitry 1020 includes various input/output (I/O) devices present within, or connected to, the platform 1000, and includes one or more user interfaces designed to enable user interaction with the platform 1000 and/or peripheral component interfaces designed to enable peripheral component interaction with the platform 1000. The user interface circuitry 1020 includes input device circuitry and output device circuitry. Input device circuitry includes any physical or virtual means for accepting an input including, inter alia, one or more physical or virtual buttons (e.g., a reset button), a physical keyboard, keypad, mouse, touchpad, touchscreen, microphones, scanner, headset, and/or the like. The output device circuitry includes any physical or virtual means for showing information or otherwise conveying information, such as sensor readings, actuator position(s), or other like information. Output device circuitry may include any number and/or combinations of audio or visual display, including, inter alia, one or more simple visual outputs/indicators such as binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the platform 1000. The output device circuitry may also include speakers or other audio emitting devices, printer(s), and/or the like. In some embodiments, the sensors 1022 may be used as the input device circuitry (e.g., an image capture device, motion capture device, or the like) and one or more EMCs may be used as the output device circuitry (e.g., an actuator to provide haptic feedback or the like). In another example, NFC circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc.

Although not shown, the components of platform 1000 may communicate with one another using a suitable bus or interconnect (IX) technology, which may include any number of technologies, including ISA, EISA, PCI. PCix, PCie, a Time-Trigger Protocol (TTP) system, a FlexRay system, or any number of other technologies. The bus/IX may be a proprietary bus/IX, for example, used in a SoC based system. Other bus/IX systems may be included, such as an I$^2$C interface, an SPI interface, point-to-point interfaces, and a power bus, among others.

Figure 11:
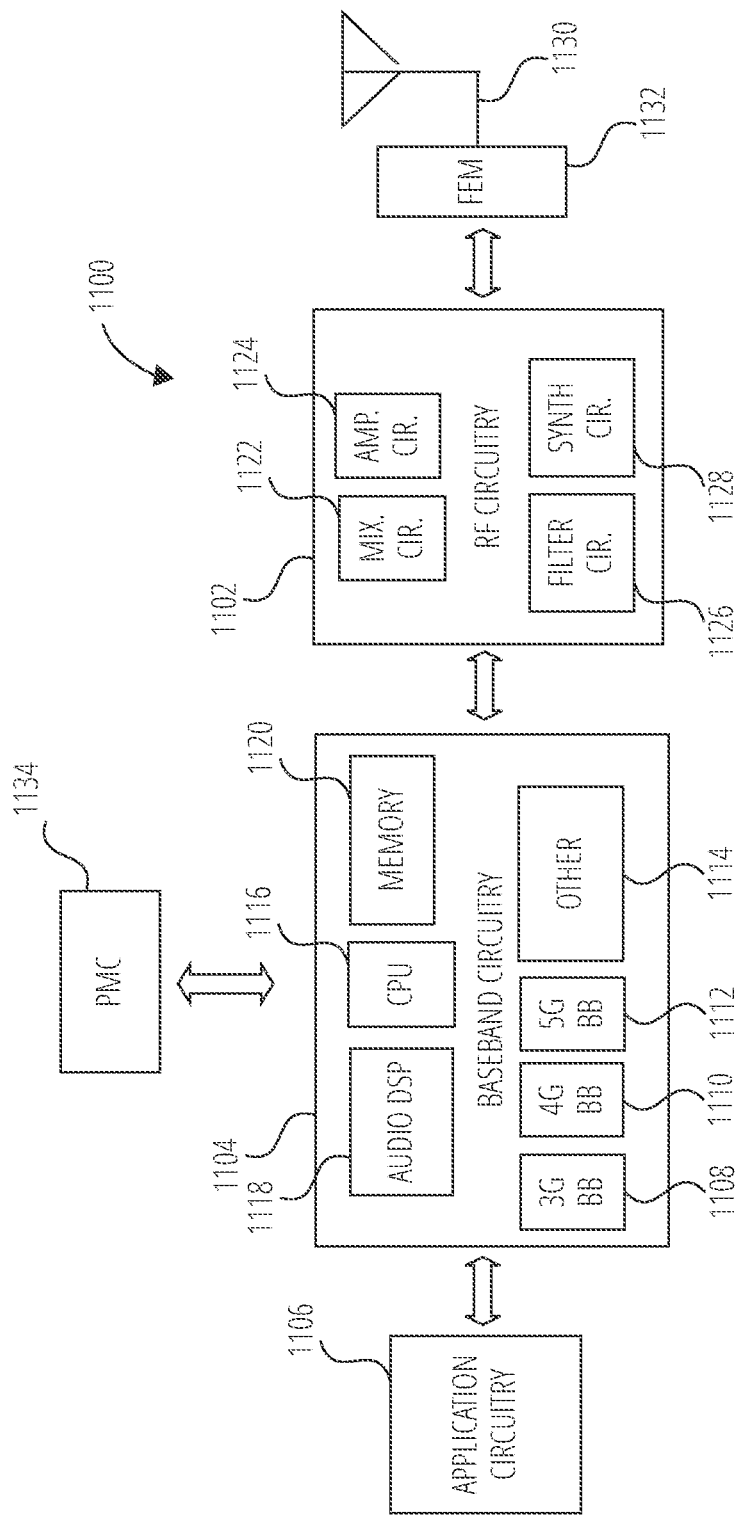
FIG. 11 illustrates a device in accordance with one embodiment.

FIG. 11 illustrates example components of a device 1100 in accordance with some embodiments. In some embodiments, the device 1100 may include application circuitry 1106, baseband circuitry 1104, Radio Frequency (RF) circuitry (shown as RF circuitry 1102), front-end module (FEM) circuitry (shown as FEM circuitry 1132), one or more antennas 1130, and power management circuitry (PMC) (shown as PMC 1134) coupled together at least as shown. The components of the illustrated device 1100 may be included in a UE or a RAN node. In some embodiments, the device 1100 may include fewer elements (e.g., a RAN node may not utilize application circuitry 1106, and instead include a processor/controller to process IP data received from an EPC). In some embodiments, the device 1100 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 1106 may include one or more application processors. For example, the application circuitry 1106 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 1100. In some embodiments, processors of application circuitry 1106 may process IP data packets received from an EPC.

The baseband circuitry 1104 may include circuitry such as, but not limited to, one or more single-core or multi-core processors. The baseband circuitry 1104 may include one or more baseband processors or control logic to process baseband signals received from a receive signal path of the RF circuitry 1102 and to generate baseband signals for a transmit signal path of the RF circuitry 1102. The baseband circuitry 1104 may interface with the application circuitry 1106 for generation and processing of the baseband signals and for controlling operations of the RF circuitry 1102. For example, in some embodiments, the baseband circuitry 1104 may include a third generation (3G) baseband processor (3G baseband processor 1108), a fourth generation (4G) baseband processor (4G baseband processor 1110), a fifth generation (5G) baseband processor (5G baseband processor 1112), or other baseband processor(s) 1114 for other existing generations, generations in development or to be developed in the future (e.g., second generation (2G), sixth generation (6G), etc.). The baseband circuitry 1104 (e.g., one or more of baseband processors) may handle various radio control functions that enable communication with one or more radio networks via the RF circuitry 1102. In other embodiments, some or all of the functionality of the illustrated baseband processors may be included in modules stored in the memory 1120 and executed via a Central Processing Unit (CPU 1116). The radio control functions may include, but are not limited to, signal modulation/demodulation, encoding/decoding, radio frequency shifting, etc. In some embodiments, modulation/demodulation circuitry of the baseband circuitry 1104 may include Fast-Fourier Transform (FFT), preceeding, or constellation mapping/demapping functionality. In some embodiments, encoding/decoding circuitry of the baseband circuitry 1104 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1104 may include a digital signal processor (DSP), such as one or more audio DSP(s) 1118. The one or more audio DSP(s) 1118 may include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1104 and the application circuitry 1106 may be implemented together such as, for example, on a system on a chip (SOC).

In some embodiments, the baseband circuitry 1104 may provide for communication compatible with one or more radio technologies. For example, in some embodiments, the baseband circuitry 1104 may support communication with an evolved universal terrestrial radio access network (EU-TRAN) or other wireless metropolitan area networks (WMAN), a wireless local area network (WLAN), or a wireless personal area network (WPAN). Embodiments in which the baseband circuitry 1104 is configured to support radio communications of more than one wireless protocol may be referred to as multi-mode baseband circuitry.

The RF circuitry 1102 may enable communication with wireless networks using modulated electromagnetic radiation through a non-solid medium. In various embodiments, the RF circuitry 1102 may include switches, filters, amplifiers, etc. to facilitate the communication with the wireless network. The RF circuitry 1102 may include a receive signal path which may include circuitry to down-convert RF signals received from the FEM circuitry 1132 and provide baseband signals to the baseband circuitry 1104. The RF circuitry 1102 may also include a transmit signal path which may include circuitry to up-convert baseband signals provided by the baseband circuitry 1104 and provide RF output signals to the FEM circuitry 1132 for transmission.

In some embodiments, the receive signal path of the RF circuitry 1102 may include mixer circuitry 1122, amplifier circuitry 1124 and filter circuitry 1126. In some embodiments, the transmit signal path of the RF circuitry 1102 may include filter circuitry 1126 and mixer circuitry 1122. The RF circuitry 1102 may also include synthesizer circuitry 1128 for synthesizing a frequency for use by the mixer circuitry 1122 of the receive signal path and the transmit signal path. In some embodiments, the mixer circuitry 1122 of the receive signal path may be configured to down-convert RF signals received from the FEM circuitry 1132 based on the synthesized frequency provided by synthesizer circuitry 1128. The amplifier circuitry 1124 may be configured to amplify the down-converted signals and the filter circuitry 1126 may be a low-pass filter (LPF) or band-pass filter (BPF) configured to remove unwanted signals from the down-converted signals to generate output baseband signals. Output baseband signals may be provided to the baseband circuitry 1104 for further processing. In some embodiments, the output baseband signals may be zero-frequency baseband signals, although this is not a requirement. In some embodiments, the mixer circuitry 1122 of the receive signal path may comprise passive mixers, although the scope of the embodiments is not limited in this respect.

In some embodiments, the mixer circuitry 1122 of the transmit signal path may be configured to up-convert input baseband signals based on the synthesized frequency provided by the synthesizer circuitry 1128 to generate RF output signals for the FEM circuitry 1132. The baseband signals may be provided by the baseband circuitry 1104 and may be filtered by the filter circuitry 1126.

In some embodiments, the mixer circuitry 1122 of the receive signal path and the mixer circuitry 1122 of the transmit signal path may include two or more mixers and may be arranged for quadrature downconversion and upconversion, respectively. In some embodiments, the mixer circuitry 1122 of the receive signal path and the mixer circuitry 1122 of the transmit signal path may include two or more mixers and may be arranged for image rejection (e.g., Hartley image rejection). In some embodiments, the mixer circuitry 1122 of the receive signal path and the mixer circuitry 1122 may be arranged for direct downconversion and direct upconversion, respectively. In some embodiments, the mixer circuitry 1122 of the receive signal path and the mixer circuitry 1122 of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1102 may include analog-to-digital converter (ADC) and digital-to-analog converter (DAC) circuitry and the baseband circuitry 1104 may include a digital baseband interface to communicate with the RF circuitry 1102.

In some dual-mode embodiments, a separate radio IC circuitry may be provided for processing signals for each spectrum, although the scope of the embodiments is not limited in this respect.

In some embodiments, the synthesizer circuitry 1128 may be a fractional-N synthesizer or a fractional N/N+1 synthesizer, although the scope of the embodiments is not limited in this respect as other types of frequency synthesizers may be suitable. For example, synthesizer circuitry 1128 may be a delta-sigma synthesizer, a frequency multiplier, or a synthesizer comprising a phase-locked loop with a frequency divider.

The synthesizer circuitry 1128 may be configured to synthesize an output frequency for use by the mixer circuitry 1122 of the RF circuitry 1102 based on a frequency input and a divider control input. In some embodiments, the synthesizer circuitry 1128 may be a fractional N/N+1 synthesizer.

In some embodiments, frequency input may be provided by a voltage controlled oscillator (VCO), although that is not a requirement. Divider control input may be provided by either the baseband circuitry 1104 or the application circuitry 1106 (such as an applications processor) depending on the desired output frequency. In some embodiments, a divider control input (e.g., N) may be determined from a look-up table based on a channel indicated by the application circuitry 1106.

Synthesizer circuitry 1128 of the RF circuitry 1102 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, the synthesizer circuitry 1128 may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1102 may include an IQ/polar converter.

The FEM circuitry 1132 may include a receive signal path which may include circuitry configured to operate on RF signals received from one or more antennas 1130, amplify the received signals and provide the amplified versions of the received signals to the RF circuitry 1102 for further processing. The FEM circuitry 1132 may also include a transmit signal path which may include circuitry configured to amplify signals for transmission provided by the RF circuitry 1102 for transmission by one or more of the one or more antennas 1130. In various embodiments, the amplification through the transmit or receive signal paths may be done solely in the RF circuitry 1102, solely in the FEM circuitry 1132, or in both the RF circuitry 1102 and the FEM circuitry 1132.

In some embodiments, the FEM circuitry 1132 may include a TX/RX switch to switch between transmit mode and receive mode operation. The FEM circuitry 1132 may include a receive signal path and a transmit signal path. The receive signal path of the FEM circuitry 1132 may include an LNA to amplify received RF signals and provide the amplified received RF signals as an output (e.g., to the RF circuitry 1102). The transmit signal path of the FEM circuitry 1132 may include a power amplifier (PA) to amplify input RF signals (e.g., provided by the RF circuitry 1102), and one or more filters to generate RF signals for subsequent transmission (e.g., by one or more of the one or more antennas 1130).

In some embodiments, the PMC 1134 may manage power provided to the baseband circuitry 1104. In particular, the PMC 1134 may control power-source selection, voltage scaling, battery charging, or DC-to-DC conversion. The PMC 1134 may often be included when the device 1100 is capable of being powered by a battery, for example, when the device 1100 is included in a UE. The PMC 1134 may increase the power conversion efficiency while providing desirable implementation size and heat dissipation characteristics.

FIG. 1 shows the PMC 1134 coupled only with the baseband circuitry 1104. However, in other embodiments, the PMC 1134 may be additionally or alternatively coupled with, and perform similar power management operations for, other components such as, but not limited to, the application circuitry 1106, the RF circuitry 1102, or the FEM circuitry 1132.

In some embodiments, the PMC 1134 may control, or otherwise be part of, various power saving mechanisms of the device 1100. For example, if the device 1100 is in an RRC_Connected state, where it is still connected to the RAN node as it expects to receive traffic shortly, then it may enter a state known as Discontinuous Reception Mode (DRX)

after a period of inactivity. During this state, the device 1100 may power down for brief intervals of time and thus save power.

If there is no data traffic activity for an extended period of time, then the device 1100 may transition off to an RRC_Idle state, where it disconnects from the network and does not perform operations such as channel quality feedback, handover, etc. The device 1100 goes into a very low power state and it performs paging where again it periodically wakes up to listen to the network and then powers down again. The device 1100 may not receive data in this state, and in order to receive data, it transitions back to an RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 1106 and processors of the baseband circuitry 1104 may be used to execute elements of one or more instances of a protocol stack. For example, processors of the baseband circuitry 1104, alone or in combination, may be used to execute Layer 3, Layer 2, or Layer 1 functionality, while processors of the application circuitry 1106 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 12:
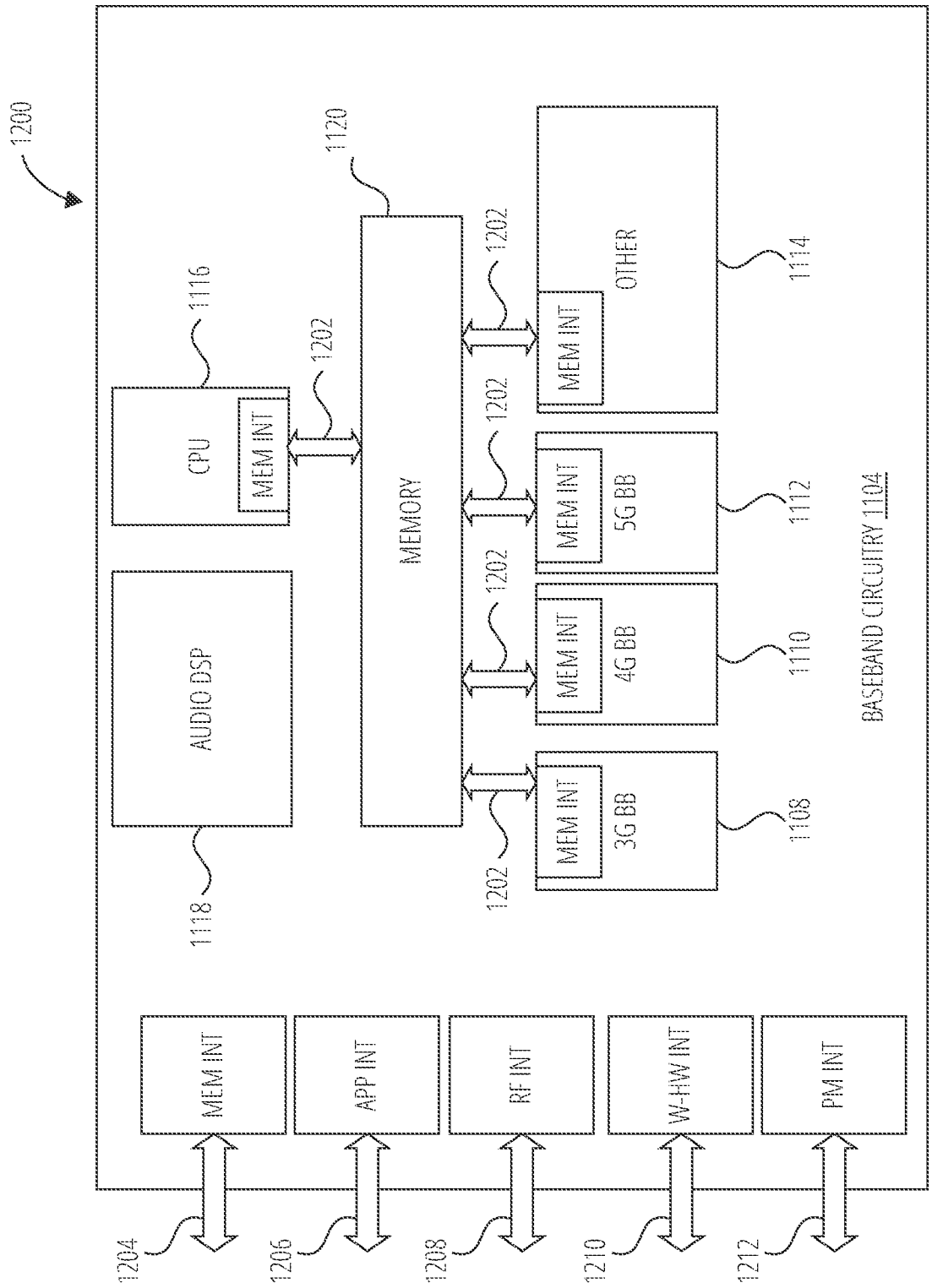
FIG. 12 illustrates example interfaces in accordance with one embodiment.

FIG. 12 illustrates example interfaces 1200 of baseband circuitry in accordance with some embodiments. As discussed above, the baseband circuitry 1104 of FIG. 11 may comprise 3G baseband processor 1108, 4G baseband processor 1110, 5G baseband processor 1112, other baseband processor(s) 1114, CPU 1116, and a memory 1120 utilized by said processors. As illustrated, each of the processors may include a respective memory interface 1202 to send/receive data to/from the memory 1120.

The baseband circuitry 1104 may further include one or more interfaces to communicatively couple to other circuitries/devices, such as a memory interface 1204 (e.g., an interface to send/receive data to/from memory external to the baseband circuitry 1104), an application circuitry interface 1206 (e.g., an interface to send/receive data to/from the application circuitry 1106 of FIG. 11), an RF circuitry interface 1208 (e.g., an interface to send/receive data to/from RF circuitry 1102 of FIG. 11), a wireless hardware connectivity interface 1210 (e.g., an interface to send/receive data to/from Near Field Communication (NFC) components, Bluetooth® components (e.g., Bluetooth® Low Energy), Wi-Fi® components, and other communication components), and a power management interface 1212 (e.g., an interface to send/receive power or control signals to/from the PMC 1134.

Figure 13:
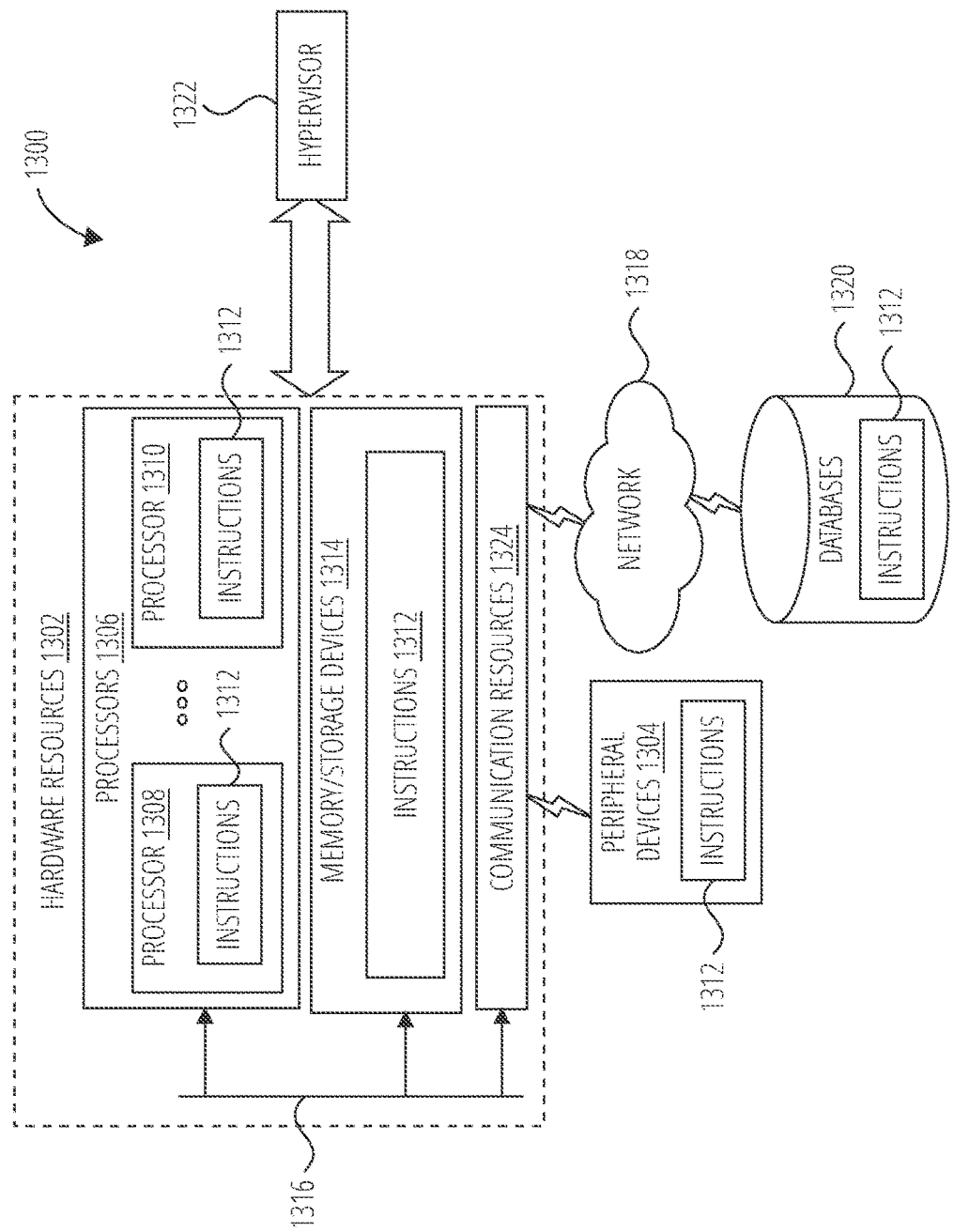
FIG. 13 illustrates components in accordance with one embodiment.

FIG. 13 is a block diagram illustrating components 1300, according to some example embodiments, able to read instructions from a machine-readable or computer-readable medium (e.g., a non-transitory machine-readable storage medium) and perform any one or more of the methodologies discussed herein. Specifically, FIG. 13 shows a diagrammatic representation of hardware resources 1302 including one or more processors 1306 (or processor cores), one or more memory/storage devices 1314, and one or more communication resources 1324, each of which may be communicatively coupled via a bus 1316. For embodiments where node virtualization (e.g., NFV) is utilized, a hypervisor 1322 may be executed to provide an execution environment for one or more network slices/sub-slices to utilize the hardware resources 1302.

The processors 1306 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1308 and a processor 1310.

The memory/storage devices 1314 may include main memory, disk storage, or any suitable combination thereof. The memory/storage devices 1314 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1324 may include interconnection or network interface components or other suitable devices to communicate with one or more peripheral devices 1304 or one or more databases 1320 via a network 1318. For example, the communication resources 1324 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1312 may comprise software, a program, an application, an applet, an app, or other executable code for causing at least any of the processors 1306 to perform any one or more of the methodologies discussed herein. The instructions 1312 may reside, completely or partially, within at least one of the processors 1306 (e.g., within the processor's cache memory), the memory/storage devices 1314, or any suitable combination thereof. Furthermore, any portion of the instructions 1312 may be transferred to the hardware resources 1302 from any combination of the peripheral devices 1304 or the databases 1320. Accordingly, the memory of the processors 1306, the memory/storage devices 1314, the peripheral devices 1304, and the databases 1320 are examples of computer-readable and machine-readable media.

For one or more embodiments, at least one of the components set forth in one or more of the preceding figures may be configured to perform one or more operations, techniques, processes, and/or methods as set forth in the Example Section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

Example Section

The following examples pertain to further embodiments.

Example 1A may include a method for wireless communications by a base station, comprising: decoding a random access channel (RACH) preamble received from a user equipment (UE) via a physical random access channel (PRACH); determining a number of repetitions associated with transmitting a random access response (RAR) over a physical downlink shared channel (PDSCH) in response to the RACH preamble; and encoding a transmission for the UE to be sent over a physical downlink control channel (PDCCH), the transmission indicating the number of repetitions to the UE using one or more reserved bits of a downlink control information (DCI).

Example 2A may include the method of example 1A, wherein indicating the number of repetitions using the one or more reserved bits of the DCI further comprises: indicating the number of repetitions in a system information block (SIB); and mapping the DCI to the indicated number of repetitions in the SIB.

Example 3A may include the method of example 1A, wherein indicating the number of repetitions using one or more reserved bits of the DCI comprises directly indicating the number of repetitions using the DCI.

Example 4A may include the method of example 1A, further comprising: encoding the RAR for transmission over the PDSCH: and transmitting the PDSCH up to as many times as the number of repetitions.

Example 5A may include the method of example 1A, wherein the DCI comprises DCI format 1_0 with a cyclic redundancy check (CRC) scrambled by a random access-radio network temporary identifier (RA-RNTI).

Example 6A may include the method of example 1A, wherein indicating the number of repetitions comprises indicating the number of repetitions using a media access control (MAC) control element (MAC CE). Example 7A may include a method for wireless communications by a base station, comprising: decoding a random access channel (RACH) preamble received from a user equipment (UE) via a physical random access channel (PRACH); encoding a random access response (RAR) over a physical downlink shared channel (PDSCH) in response to the RACH preamble; decoding a scheduled uplink (UL) transmission received from the UE over a physical uplink shared channel; determining a number of repetitions associated with transmitting a response to the scheduled UL transmission over the PDSCH: and encoding a transmission for the UE to be sent over a physical downlink control channel (PDCCH), the transmission indicating the number of repetitions to the UE.

Example 8A may include the method of example 7A, wherein indicating the number of repetitions comprises using downlink assignment index (DAI) bits to indicate the number of repetitions.

Example 9A may include the method of example 7A, wherein indicating the number of repetitions comprises reusing one or more bits of a hybrid automatic repeat request (HARQ) process number (HPN) to indicate the number of repetitions.

Example 10A may include the method of example 7A, further comprising: encoding the response to the scheduled UL transmission for transmitting over the PDSCH; and transmitting the response to the scheduled UL transmission up to as many times as the number of repetitions.

Example 11A may include the method of example 7A, wherein the transmission comprises downlink control information (DCI) format 1_0 with a cyclic redundancy check (CRC) scrambled by a temporary cell-radio network temporary identifier (TC-RNTI).

Example 12A may include a method for wireless communications by a base station, comprising: decoding a random access channel (RACH) preamble received from a user equipment (UE) via a physical random access channel (PRACH); determining a number of repetitions associated with the UE transmitting a scheduled uplink (UL) transmission over a physical uplink shared channel (PUSCH), the scheduled UL transmission being scheduled by the base station in response to decoding the RACH preamble; and encoding a transmission for the UE to be sent over a physical downlink control channel (PDCCH), the transmission indicating the number of repetitions to the UE.

Example 13A may include the method of example 12A, wherein indicating the number of repetitions comprises using at least one of one or more hybrid automatic repeat request (HARQ) process number (HPN) bits and a new data indicator (NDI) bit to indicate the number of repetitions.

Example 14A may include the method of example 12A, wherein using at least one of the one or more HPN bits and the NDI bit to indicate the number of repetitions includes using the one or more HPN bits to indicate the number of repetitions when the NDI bit is set to 1.

Example 15A may include the method of example 12A, wherein indicating the number of repetitions comprises using one of two least significant bits (LSB) of hybrid automatic repeat request (HARQ) process number (HPN) bits, two most significant bits (MSB) of the HPN bits, or all of the HPN bits.

Example 16A may include a method for wireless communications by a base station, comprising: decoding a random access channel (RACH) preamble received from a user equipment (UE) via a physical random access channel (PRACH): determining a validity of transform precoding associated with the UE transmitting a scheduled uplink (UL) transmission over a physical uplink shared channel (PUSCH), the scheduled UL transmission being scheduled by the base station in response to decoding the RACH preamble; and encoding a transmission for the UE to be sent over a physical downlink control channel (PDCCH), the transmission indicating the validity of transform precoding to the UE.

Example 17A may include the method of example 16A, wherein the PUSCH for the scheduled UL transmission is scheduled by random access response (RAR) UL grant.

Example 18A may include the method of example 17A, wherein indicating the validity of transform precoding comprises indicating that transform precoding is enabled based on a single reserved bit in a first Oct of the RAR.

Example 19A may include the method of example 16A, wherein the PUSCH for the scheduled UL transmission is scheduled by a downlink control information (DCI) format 0_0 with a cyclic redundancy check (CRC) scrambled by a temporary cell-radio network temporary identifier (TC-RNTI).

Example 20A may include the method of example 19A, wherein indicating the validity of transform precoding comprises indicating that transform precoding is enabled based on a value of a new data indicator (NDI) bit.

Example 1B may include an apparatus comprising means to perform one or more elements of a method described in or related to any of the above Examples, or any other method or process described herein.

Example 2B may include one or more non-transitory computer-readable media comprising instructions to cause an electronic device, upon execution of the instructions by one or more processors of the electronic device, to perform one or more elements of a method described in or related to any of the above Examples, or any other method or process described herein.

Example 3B may include an apparatus comprising logic, modules, or circuitry to perform one or more elements of a method described in or related to any of the above Examples, or any other method or process described herein.

Example 4B may include a method, technique, or process as described in or related to any of the above Examples, or portions or parts thereof.

Example 5B may include an apparatus comprising: one or more processors and one or more computer-readable media comprising instructions that, when executed by the one or more processors, cause the one or more processors to perform the method, techniques, or process as described in or related to any of the above Examples, or portions thereof.

Example 6B may include a signal as described in or related to any of the above Examples, or portions or parts thereof.

Example 7B may include a datagram, packet, frame, segment, protocol data unit (PDU), or message as described in or related to any of the above Examples, or portions or parts thereof, or otherwise described in the present disclosure.

Example 8B may include a signal encoded with data as described in or related to any of the above Examples, or portions or parts thereof, or otherwise described in the present disclosure.

Example 9B may include a signal encoded with a datagram, packet, frame, segment, PDU, or message as described in or related to any of the above Examples, or portions or parts thereof, or otherwise described in the present disclosure.

Example 10B may include an electromagnetic signal carrying computer-readable instructions, wherein execution of the computer-readable instructions by one or more processors is to cause the one or more processors to perform the method, techniques, or process as described in or related to any of the above Examples, or portions thereof.

Example 11B may include a computer program comprising instructions, wherein execution of the program by a processing element is to cause the processing element to carry out the method, techniques, or process as described in or related to any of the above Examples, or portions thereof.

Example 12B may include a signal in a wireless network as shown and described herein.

Example 13B may include a method of communicating in a wireless network as shown and described herein.

Example 14B may include a system for providing wireless communication as shown and described herein.

Example 15B may include a device for providing wireless communication as shown and described herein.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways.

In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

What is claimed is:

1. A method for wireless communications by a base station, comprising:
   decoding a random access channel (RACH) preamble received from a user equipment (UE) via a physical random access channel (PRACH);
   determining a number of repetitions for transmitting a random access response (RAR) over a physical downlink shared channel (PDSCH) in response to the RACH preamble; and
   encoding a transmission for the UE to be sent over a physical downlink control channel (PDCCH), the transmission indicating the number of repetitions for transmitting the RAR to the UE using one or more reserved bits of a downlink control information (DCI) that schedules the repetitions for transmitting the RAR;
   wherein indicating the number of repetitions using the one or more reserved bits of the DCI that schedules the repetitions for transmitting the RAR comprises:
   indicating the number of repetitions in a system information block (SIB), and
   mapping the one or more reserved bits of the DCI to the indicated number of repetitions in the SIB.

2. The method of claim 1, further comprising:
   encoding the RAR for transmission over the PDSCH; and
   transmitting the PDSCH up to as many times as the number of repetitions.

3. The method of claim 1, wherein the DCI comprises DCI format 1_0 with a cyclic redundancy check (CRC) scrambled by a random access-radio network temporary identifier (RA-RNTI).

4. An apparatus of a base station, comprising:
one or more processors; and
memory storing instructions that, when executed by the one or more processors, configure the base station to:
  decode a random access channel (RACH) preamble received from a user equipment (UE) via a physical random access channel (PRACH);
  determine a number of repetitions for transmitting a random access response (RAR) over a physical downlink shared channel (PDSCH) in response to the RACH preamble; and
  encode a transmission for the UE to be sent over a physical downlink control channel (PDCCH), the transmission indicating the number of repetitions for transmitting the RAR to the UE using one or more reserved bits of a downlink control information (DCI) that schedules the repetitions for transmitting the RAR;
  wherein indicating the number of repetitions using the one or more reserved bits of the DCI that schedules the repetitions for transmitting the RAR comprises:
    indicating the number of repetitions in a system information block (SIB), and
    mapping the one or more reserved bits of the DCI to the indicated number of repetitions in the SIB.

5. The apparatus of claim 4, wherein the instructions, when executed by the one or more processors, further configure the base station to:
  encode the RAR for transmission over the PDSCH; and
  transmit the PDSCH up to as many times as the number of repetitions.

6. The apparatus of claim 4, wherein the DCI comprises DCI format 1_0 with a cyclic redundancy check (CRC) scrambled by a random access-radio network temporary identifier (RA-RNTI).

7. A non-transitory computer-readable storage medium including instructions that, when executed by one or more processors of a base station, cause the base station to:
  decode a random access channel (RACH) preamble received from a user equipment (UE) via a physical random access channel (PRACH);
  determine a number of repetitions for transmitting a random access response (RAR) over a physical downlink shared channel (PDSCH) in response to the RACH preamble; and
  encode a transmission for the UE to be sent over a physical downlink control channel (PDCCH), the transmission indicating the number of repetitions for transmitting the RAR to the UE using one or more reserved bits of a downlink control information (DCI) that schedules the repetitions for transmitting the RAR;
  wherein indicating the number of repetitions using the one or more reserved bits of the DCI that schedules the repetitions for transmitting the RAR comprises:
    indicating the number of repetitions in a system information block (SIB), and
    mapping the one or more reserved bits of the DCI to the indicated number of repetitions in the SIB.

8. The non-transitory computer-readable storage medium of claim 7, wherein the instructions, when executed by the one or more processors, further cause the base station to:
  encode the RAR for transmission over the PDSCH; and
  transmit the PDSCH up to as many times as the number of repetitions.

9. The non-transitory computer-readable storage medium of claim 7, wherein the DCI comprises DCI format 1_0 with a cyclic redundancy check (CRC) scrambled by a random access-radio network temporary identifier (RA-RNTI).

* * * * *